(12) United States Patent
Villette et al.

(10) Patent No.: US 12,259,075 B2
(45) Date of Patent: Mar. 25, 2025

(54) METHOD AND SYSTEM FOR AUTOMATED INSTALLATION OF WELDED REINFORCED THERMOSETTING RESIN PIPE JOINTS

(71) Applicant: SAUDI ARABIAN OIL COMPANY, Dhahran (SA)

(72) Inventors: Thibault Villette, Belfort (FR); Abderrazak Traidia, Lussan (FR); Abdullah Al Shahrani, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 169 days.

(21) Appl. No.: 18/160,045

(22) Filed: Jan. 26, 2023

(65) Prior Publication Data

US 2024/0255088 A1    Aug. 1, 2024

(51) Int. Cl.
| | | |
|---|---|---|
| *B29C 65/00* | (2006.01) | |
| *B29C 65/32* | (2006.01) | |
| *F16L 47/02* | (2006.01) | |
| *F16L 47/10* | (2006.01) | |
| *B29L 23/00* | (2006.01) | |

(52) U.S. Cl.
CPC ............ *F16L 47/02* (2013.01); *B29C 65/32* (2013.01); *F16L 47/10* (2013.01); *B29L 2023/22* (2013.01)

(58) Field of Classification Search
CPC .................................. B29C 65/32; F16L 47/02
See application file for complete search history.

(56) References Cited

U.S. PATENT DOCUMENTS

| | | | |
|---|---|---|---|
| 170,473 | A | 11/1875 | Flagler et al. |
| 2,559,806 | A | 7/1951 | Thompson |
| 2,958,906 | A | 11/1960 | Youthed |

(Continued)

FOREIGN PATENT DOCUMENTS

| | | |
|---|---|---|
| CA | 2116083 A1 | 8/1994 |
| CN | 1086763 A | 5/1994 |

(Continued)

OTHER PUBLICATIONS

International Search Report and Written Opinion issued in Application No. PCT/US2024/012028, mailed on Jul. 12, 2024 (20 pages).

(Continued)

*Primary Examiner* — Philip C Tucker
*Assistant Examiner* — Nickolas R Harm
(74) *Attorney, Agent, or Firm* — Osha Bergman Watanabe & Burton LLP

(57) ABSTRACT

A system and method for automatically jointing of reinforced thermosetting resin (RTR) pipes. For example, an automated installation of RTR joints system may have an inductor and a pig for automated in-field installation of RTR pipes. The inductor may be fitted on an outside of RTR joint. Additionally, the pig may be inserted inside the pipeline and remotely controlled to assist operators during the alignment of the pipes and subsequent joint making/welding. Through the successive inflation and deflation of pneumatic wheels placed along the pig, the pig may autonomously move inside the RTR pipeline (from one RTR joint to the other) during the installation, while also be used to apply internal pressure at specific locations of the pipe, as needed, during installation.

7 Claims, 20 Drawing Sheets

(56) References Cited

U.S. PATENT DOCUMENTS

| | | | |
|---|---|---|---|
| 3,002,871 | A | 10/1961 | Franz et al. |
| 3,061,503 | A | 10/1962 | Gould et al. |
| 3,307,997 | A | 3/1967 | Detrick |
| 3,506,519 | A | 4/1970 | Blumenkranz |
| 3,946,761 | A | 3/1976 | Thompson et al. |
| 4,090,899 | A | 5/1978 | Reich |
| 4,530,521 | A | 7/1985 | Nyffeler et al. |
| 4,662,655 | A | 5/1987 | Fliervoet et al. |
| 4,865,674 | A | 9/1989 | Durkin |
| 5,106,130 | A | 4/1992 | Ellsworth et al. |
| 5,152,855 | A | 10/1992 | Jansman et al. |
| 5,186,500 | A | 2/1993 | Folkers |
| 5,213,379 | A | 5/1993 | Taniguchi et al. |
| 5,264,059 | A | 11/1993 | Jacaruso et al. |
| 5,758,731 | A | 6/1998 | Zollinger |
| 5,785,092 | A | 7/1998 | Friedrich et al. |
| 6,131,954 | A | 10/2000 | Campbell |
| 6,521,072 | B1 | 2/2003 | Campbell |
| 7,240,697 | B2 | 7/2007 | Beebe et al. |
| 8,424,924 | B2 | 4/2013 | LaMarca et al. |
| 8,522,827 | B2 | 9/2013 | Lazzara et al. |
| 8,746,747 | B2 | 6/2014 | McPherson |
| 8,946,761 | B2 | 2/2015 | Eissler et al. |
| 9,285,063 | B2 | 3/2016 | Jones |
| 9,358,764 | B2 | 6/2016 | Prebil et al. |
| 9,427,143 | B2 | 8/2016 | Glozman et al. |
| 9,523,447 | B2 | 12/2016 | Conrad |
| 9,528,638 | B2 | 12/2016 | Hooberman |
| 9,534,719 | B2 | 1/2017 | Eccleston et al. |
| 9,810,359 | B2 | 11/2017 | Spears et al. |
| 11,209,114 | B2 | 12/2021 | Polygerinos et al. |
| 2004/0222627 | A1 | 11/2004 | Krah |
| 2006/0279084 | A1 | 12/2006 | Collins |
| 2009/0277579 | A1 | 11/2009 | Marelli et al. |
| 2013/0036604 | A1 | 2/2013 | Schmidt et al. |
| 2013/0140811 | A1 | 6/2013 | Fahrer et al. |
| 2013/0175797 | A1 | 7/2013 | Kanao |
| 2014/0013797 | A1 | 1/2014 | Butts |
| 2014/0137971 | A1 | 5/2014 | Lundman |
| 2014/0220356 | A1 | 8/2014 | Van Tooren |
| 2014/0363220 | A1 | 12/2014 | Auer et al. |
| 2014/0375047 | A1 | 12/2014 | Jones |
| 2019/0128458 | A1 | 5/2019 | Kimball et al. |
| 2019/0323645 | A1* | 10/2019 | Polygerinos ............ F16L 55/44 |
| 2022/0018479 | A1 | 1/2022 | Traidia et al. |

FOREIGN PATENT DOCUMENTS

| | | |
|---|---|---|
| CN | 1263977 C | 7/2006 |
| CN | 104708890 B | 12/2018 |
| CN | 110131511 A | 8/2019 |
| CN | 110823481 A | 2/2020 |
| DE | 939719 C | 3/1956 |
| DE | 19911284 A1 | 9/2000 |
| DE | 102015106333 A1 | 10/2016 |
| EP | 0382593 A2 | 8/1990 |
| EP | 2340389 A2 | 7/2011 |
| EP | 2694273 A2 | 2/2014 |
| EP | 3717736 B1 | 3/2022 |
| GB | 775223 A | 5/1957 |
| GB | 775233 A | 5/1957 |
| GB | 1329364 A | 9/1973 |
| GB | 2033394 A | 5/1980 |
| GB | 2271958 A | 5/1994 |
| GB | 2425337 A | 10/2006 |
| JP | H10281383 A | 10/1998 |
| JP | 2002295780 A | 10/2002 |
| JP | 2003130276 A | 5/2003 |
| JP | 2009018576 A | 1/2009 |
| WO | 9626380 A1 | 8/1996 |
| WO | 0055538 A1 | 9/2000 |
| WO | 2005025836 A1 | 3/2005 |
| WO | 2008028224 A1 | 3/2008 |
| WO | 2009007537 A1 | 1/2009 |
| WO | 2020007924 A1 | 1/2020 |

OTHER PUBLICATIONS

Van Moorleghem, Régis, "Welding of thermoplastic to thermoset composites through a thermoplastic interlayer"; TUDelft: Delft University of Technology; Jun. 2, 2016; <http://resolver.tudelft.nl/uuid:821d5aaf-99a8-4fc7-a32d-eadb5d104aa9>; Accessed Jun. 16, 2020 (67 pages).

Villegas, Irene Fernandez et al., "Ultrasonic welding of carbon/epoxy and carbon/PEEK composites through a PEI thermoplastic coupling layer"; Composites Part A: Applied Science and Manufacturing; vol. 109; pp. 75-83; Jun. 2018; <https://doi.org/10.1016/j.compositesa.2018.02.022> (32 pages).

Hamade, Ramsey F. et al., "Rotary Friction Welding versus Fusion Butt Welding of Plastic Pipes—Feasibility and Energy Perspective"; Procedia Manufacturing; vol. 33; pp. 693-700; 2019 (8 pages).

Beiss, T. et al., "Vibration Joining of Fiber-Reinforced Termosets"; Polymer Composites; vol. 31, Issue 7; pp. 1205-1212; Jul. 2010 (8 pages).

Yousefpour, Ali et al., "Fusion Bonding/Welding of Thermoplastic Composites"; Journal of Thermoplastic Compostie Materials; vol. 17; Issue 4; pp. 303-341; Jul. 2004 (39 pages).

Dell'Anna, Riccardo et al., "Lay-Up and Consolidation of a Composite Pipe by In Situ Ultrasonic Welding of a Thermoplastic Matrix Composite Tape"; MDPI Open Access Journals: Minerals; vol. 11, Issue 5: 786; pp. 1-11; May 11, 2018 (11 pages).

International Search Report and Written Opinion of the International Searching Authority issued in corresponding International Application No. PCT/US2021/042296, mailed on Oct. 14, 2021 (14 pages).

International Search Report and Written Opinion of the International Searching Authority issued in corresponding International Application No. PCT/US2021/042330, mailed on Oct. 15, 2021 (24 pages).

International Search Report and Written Opinion of the International Searching Authority issued in corresponding International Application No. PCT/US2021/042308, mailed on Oct. 15, 2021 (14 pages).

Ageorges, C., et al. "Advances in fusion bonding techniques for joining thermoplastic matrix composites: a review", Composites Part A: Applied Science and Manufacturing. Elsevier, vol. 32, No. 6. Jun. 1, 2001, pp. 839-857, [19 Pages].

Hou, Meng. "Thermoplastic Adhesive for Thermosetting Composites", Materials Science Forum vols. 706-709. Jan. 3, 2012, pp. 2968-2973, [7 Pages].

Nomura, H., et al. "Linear Vibration Welding of Polyethylene Pipes", In Proceedings of the 10th Plastic Pipes, Plastic Pipes Conference Association, Gothenburg, Sweden. Sep. 1998, pp. 669-678, [10 Pages].

Troughton et al., "Linear Vibration Welding of Polyethylene Pipes"; In Proceedings of the 10th Plastic Pipes, Plastic Pipes Conference Association, Gothenburg, Sweden, Sep. 1998, pp. 424-432 (9 pages).

Non-Final Office Action issued in corresponding U.S. Appl. No. 17/380,885, mailed on Aug. 18, 2022 (19 pages).

International Search Report and Written Opinion issued in corresponding PCT International Application No. PCT/US2021/064133 dated Apr. 19, 2022 (16 pages).

Final Office Action issued in corresponding U.S. Appl. No. 17/380,748, mailed on Nov. 10, 2022 (12 pages).

O. Schieler et al., "Induction Welding of Hybrid Thermoplastic-thermoset Composite Parts", KMUTNB Int J Appl Sci Technol., 2016, vol. 9, No. 1, pp. 27-36 (10 pages).

Office Action issued in the correspondence U.S. Appl. No. 17/380,748, mailed May 10, 2022 (14 pages).

Office Action issued in the correspondence U.S. Appl. No. 17/380,562, mailed Mar. 15, 2022 (11 pages).

Office Action issued in the correspondence U.S. Appl. No. 17/380,748, mailed Mar. 16, 2023 (11 pages).

Office Action issued in the corresponding U.S. Appl. No. 17/380,885, mailed Aug. 18, 2022 (6 pages).

* cited by examiner

METHOD AND SYSTEM FOR AUTOMATED INSTALLATION OF WELDED REINFORCED THERMOSETTING RESIN PIPE JOINTS

BACKGROUND OF INVENTION

RTR (Reinforced Thermosetting Resin) pipe is an acronym given to a broad family of fiber reinforced thermosetting pipes manufactured via a filament winding process. The reinforcement is generally glass fiber and the resin (matrix) is a thermoset polymer, traditionally polyester, vinyl-ester, or epoxy depending on the nature of the transported fluids in the pipe and the service temperature. This has led to the development of 3 main product lines for RTR pipes; GRP (Glass Reinforced Polyester), GRV (Glass Reinforced Vinylester) and GRE (Glass Reinforced Epoxy) pipes.

RTR pipes are generally produced in rigid segments of about 10-12 meters in length and transported onsite before being eventually assembled (jointed) to each other to the required length. The historical development of RTR began with the need to replace heavy concrete and steel pipes used in utilities and potable/sewage water systems. However, the use of RTR pipes in higher value applications such as oil and gas (O&G) service (particularly GRE), has gained a great deal of attention and acceptance. Currently, thousands of kilometers of RTR pipes are installed globally (particularly in the Middle East region) on yearly basis to meet the need of critical applications such as high pressure water injection and sour crude oil flowlines. The experience of O&G operators over the last decades has shown that RTR is a mature technology and can be an economical alternative to traditional carbon steel pipes, particularly in view of the fact that RTR pipe is not subject to the same corrosion seen in carbon steel piping. Depending on the manufacturer's product portfolio, RTR line pipes are generally available in diameters ranging from 1½" to 44" and can be designed to handle pressures ranging from 150 psi to 4000 psi and temperatures up to 210° F.

Within the RTR pipe manufacturing industry is well-known that the joint/connection in an RTR pipeline system is often the limiting component towards a higher temperature and pressure operating envelope. The envelope is often defined in terms of the product pressure in view of the diameter (i.e., larger diameter RTR pipe generally cannot handle the same pressure as smaller diameter piping). Indeed, the experience of O&G operators has shown that most failures/leaks in RTR pipe systems are associated with joint failures. This could potentially reduce the confidence in the material and technology.

A number of proprietary joint designs have been developed over the years by the manufacturers, which can generally be grouped into two main types/categories; adhesive/bonded joints and interference joints. The former, adhesive/bonded joints, relies on an adhesive (or a laminate in case of wrapped/laminated joints) to transfer the load from one pipe to another and the performance/limitation of such joints is often associated with proper surface preparation, particularly in field conditions. The latter, interference joints, relies on a solid contact and direct load transfer between the two RTR pipes to be jointed, such as threaded and key-lock joints. A combination of both techniques (i.e, adhesive and interference) is also possible (e.g., the Injected Mechanical Joint—IMJ).

In general, high-pressure RTR pipes make use of interference or mechanical joints (threaded or key-lock joints), while lower pressure ratings can be achieved with adhesive and laminate joints. Examples of interference joints are shown in FIG. 1A, which shows an integral threaded joint 100, FIG. 1B, which shows a coupled threaded joint 110, FIG. 1C, which shows a key-lock joint 120, and FIG. 1D, which shows an injected mechanical joint 130. Referring to FIG. 1A, the integral threaded joint 100 is formed between a first RTR pipe 102 having a threaded spigot end and a second RTR pipe 104 having a threaded socket end. Referring to FIG. 1B, the coupled threaded joint 110 is formed between a first RTR pipe 112 having a threaded spigot end and a second RTR pipe 114 also having a threaded spigot end by employing a coupler pipe 116 having threaded socket ends. Referring to FIG. 1C, the key-lock joint 120 is formed between an RTR pipe 122 having a spigot end and an RTR pipe 124 having a socket end using locking strips 126 and a rubber sealing (O-ring) 128. Referring to FIG. 1D, the injected mechanical joint 130 is formed between an RTR pipe 132 having a spigot end and an RTR pipe 134 having a socket end using a thermoset resin 136 to achieve mechanical interlocking upon curing and two rubber sealings (O-ring) 138. For example, the thermoset resin 136 may be injected through an injection inlet 131 and fill to a cavity between the RTR pipe 132 and the RTR pipe 134. Additionally, any excess resin may be removed via an injection outlet 133. Both the key-lock joint 120 and the injected mechanical joint 130 may be limited by a sealing performance of the rubber sealings 128, 138. The sealing performance is heavily dependent on the operators' skills during installation and the long-term performance (physical/chemical degradation) of the rubber sealings 128, 138 makes them regarded as "consumable" that may need frequent replacement. The rubber sealings 128, 138 are often the weakest element in the full joint assembly, thus limiting the overall long-term performance of the joints 120 and 130.

SUMMARY OF INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a system for coupling pipes. The system may include a first pipe having a socket end; a second pipe having a spigot end, the spigot end is inserted into the socket end to form a socket/spigot interface, the first pipe and the second pipe are made from a reinforced thermosetting resin (RTR) and a thermoplastic material is disposed between an interior of the first pipe and an exterior of the second pipe; an inductor disposed around the socket end, upon application of induction heating from induction coils of the inductor, the heat between the first pipe and the second pipe is sufficient to melt the thermoplastic material such that, when the heat is removed, the hardened thermoplastic material seals the first pipe to the second pipe; and a pig having a frame disposed in the first pipe and the second pipe. The pig may include a piston with a first telescopic arm extending axially outward from one end of the piston and a second telescopic arm extending axially outward from an opposite end of the piston; a first pneumatic wheel on the first telescopic arm, the first pneumatic wheel is positioned in the first pipe; a second pneumatic wheel mounted on the piston, the second pneumatic is positioned in the spigot end; and a third pneumatic wheel mounted on the second telescopic arm, the third pneumatic wheel is positioned in the second pipe.

In another aspect, the embodiments disclosed herein relate to a method of coupling a first pipe and a second pipe, the first pipe and the second pipe are made from a reinforced thermosetting resin (RTR) and each have a spigot end and a socket end. The method may include positioning an inductor around the socket end of the first pipe; inserting a pig into the socket end of the first pipe; moving the second pipe to insert the pig within the spigot end of the second pipe; progressively inflating a first pneumatic wheel mounted on a first telescopic arm of the pig to align the second pipe with the first pipe; actuating the first telescopic arm to insert the spigot end of the second pipe into the socket end of the first pipe; inflating a second pneumatic wheel mounted on a piston of the pig; and generating induction heat with an inductor around the socket end of the first pipe to thermoplastic weld the socket end of the first pipe with the spigot end of the second pipe.

In yet another aspect, the embodiments disclosed herein relate to a non-transitory computer readable medium storing instruction on a memory coupled to a processor. The instructions may include functionality for: emitting, with an emitter on an inductor, electro-magnetic waves towards a pig within a pipe; reflecting the electro-magnetic waves off reflecting straps on a piston of the pig; receiving, with a receiver on the inductor, the reflected electro-magnetic waves return to the receiver on the inductor; and computing an axial position a pneumatic wheel on the piston based on a relative position of the reflecting straps with respect to the inductor Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, shapes of the elements as drawn are not necessarily intended to convey any information regarding the actual shape of the elements and have been solely selected for ease of recognition in the drawing.

DETAILED DESCRIPTION

Figure 1A:
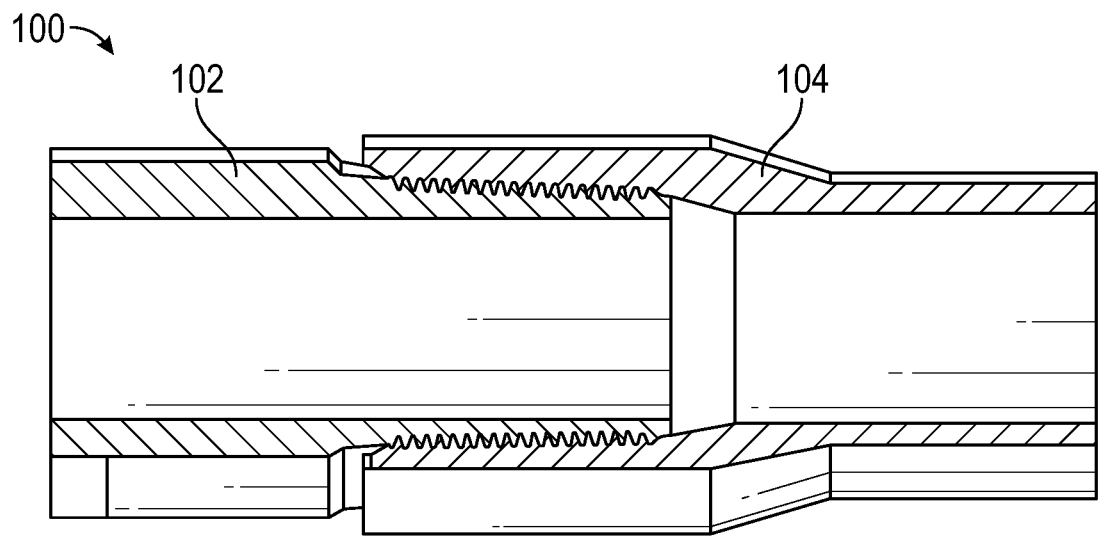
FIG. 1A shows an integral threaded joint of the prior art.
Figure 1B:
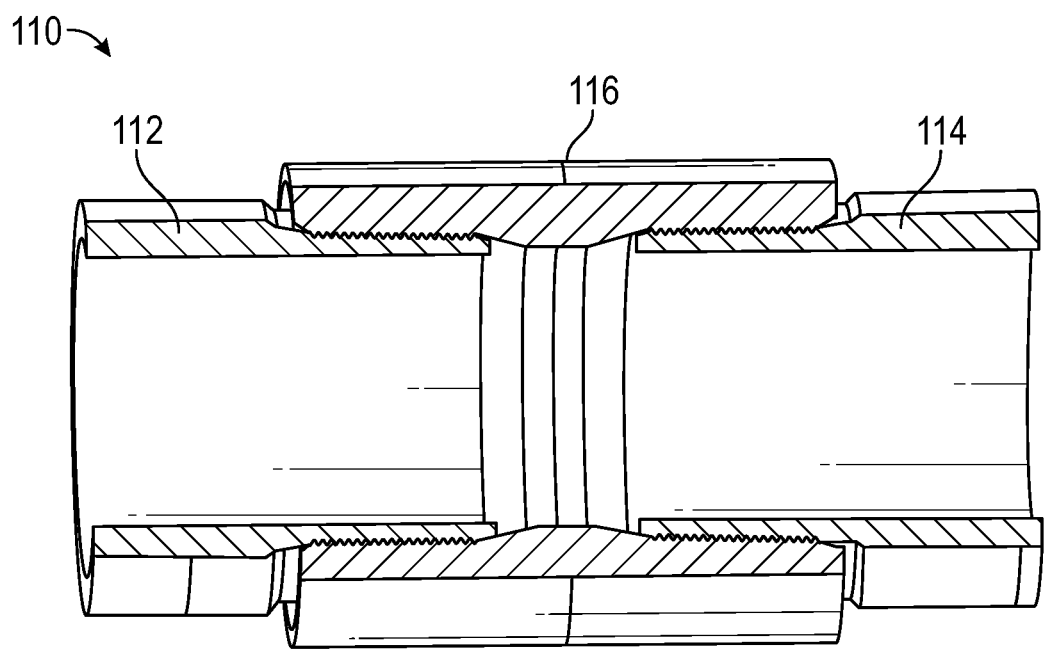
FIG. 1B shows a coupled threaded joint of the prior art.
Figure 1C:
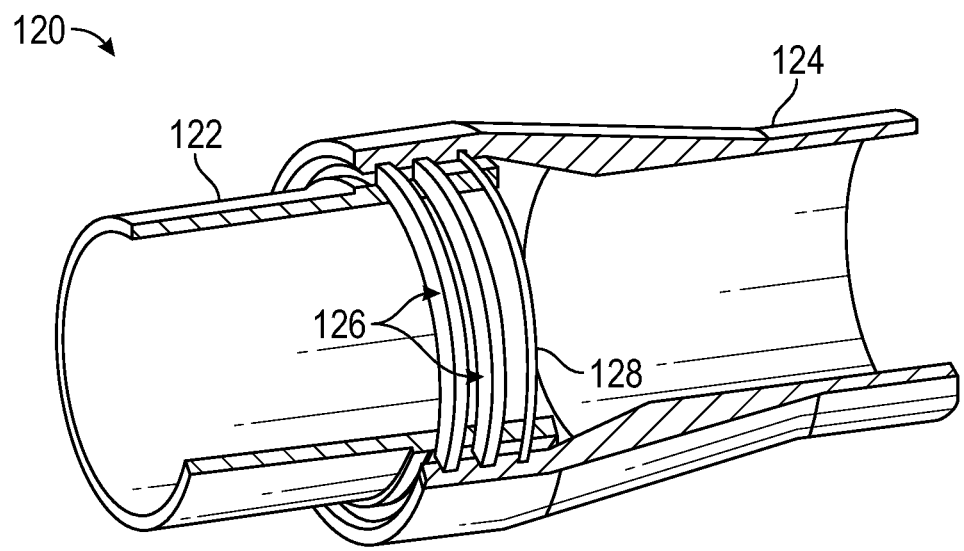
FIG. 1C shows a key-lock joint of the prior art.
Figure 1D:
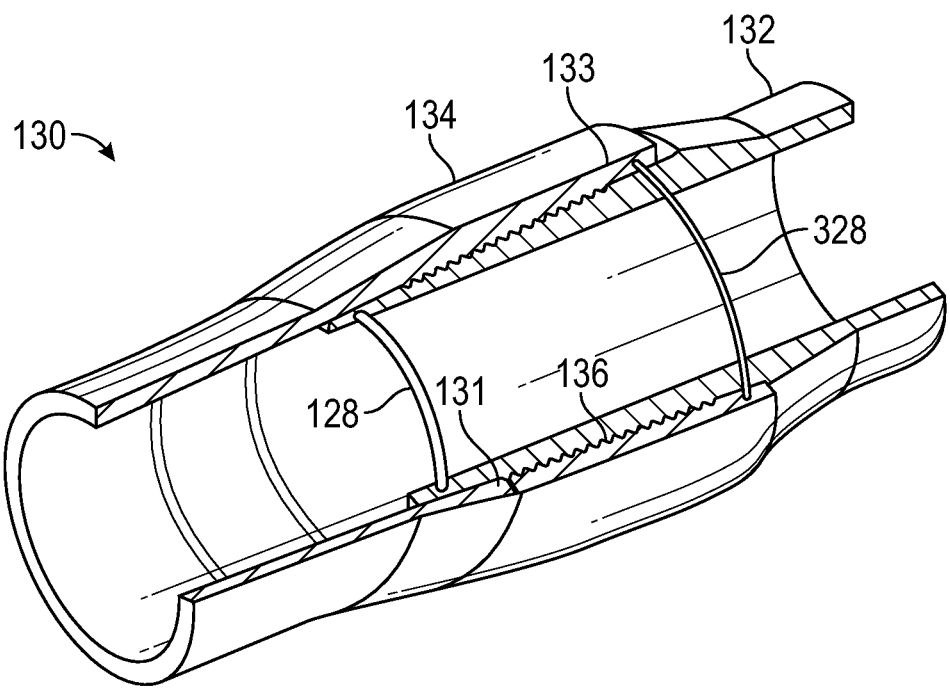
FIG. 1D shows an injected mechanical joint of the prior art.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

As used herein, the term "coupled" or "coupled to" or "connected" or "connected to" "attached" or "attached to" may indicate establishing either a direct or indirect connection and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification. In addition, any terms designating tubular (i.e., any tubular extending from a first end to a second end with a conduit between the ends) should not be deemed to limit the scope of the disclosure.

Threaded joints are traditionally used for high pressure RTR pipes. These can be either "integral" (i.e., a connection that does not use a joining member/coupler to transfer the load from one pipe to the other) or using a "coupler." Although threaded joints can achieve outstanding performance, in terms pressure rating and sealing capacity, the experience of O&G operators has shown that failures can happen. The general opinion is that the failures are associated with improper installation by the jointers (pipe misalignment, over-torqueing, improper/insufficient taping of the thread compound—TEFLON® (a trademark of the "The Chemours Company FC, LLC"), etc.).

Figure 2A:
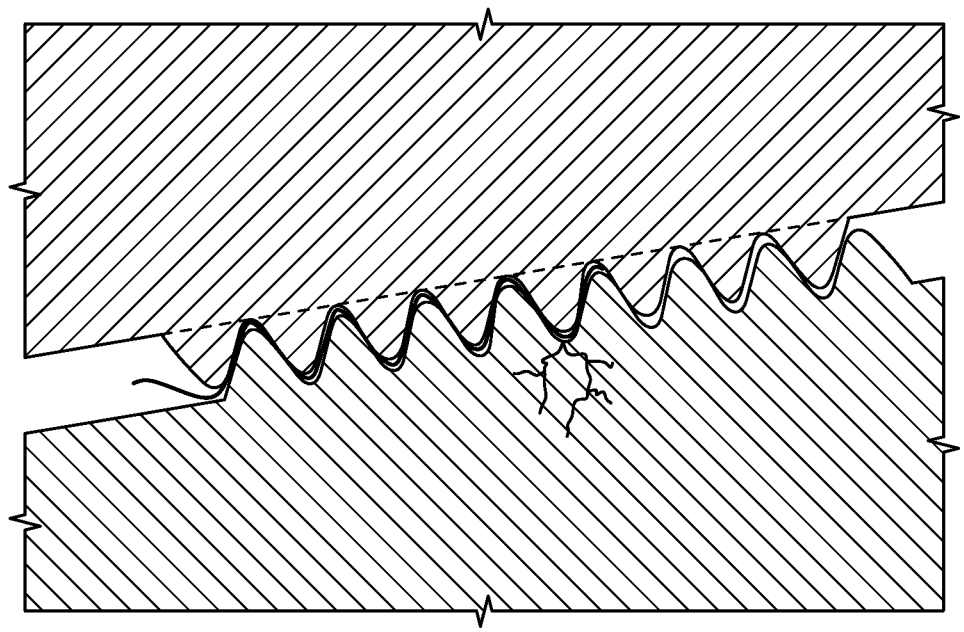
FIGS. 2A-2C show schematic representations of overloading failure of RTR connections.
Figure 2B:
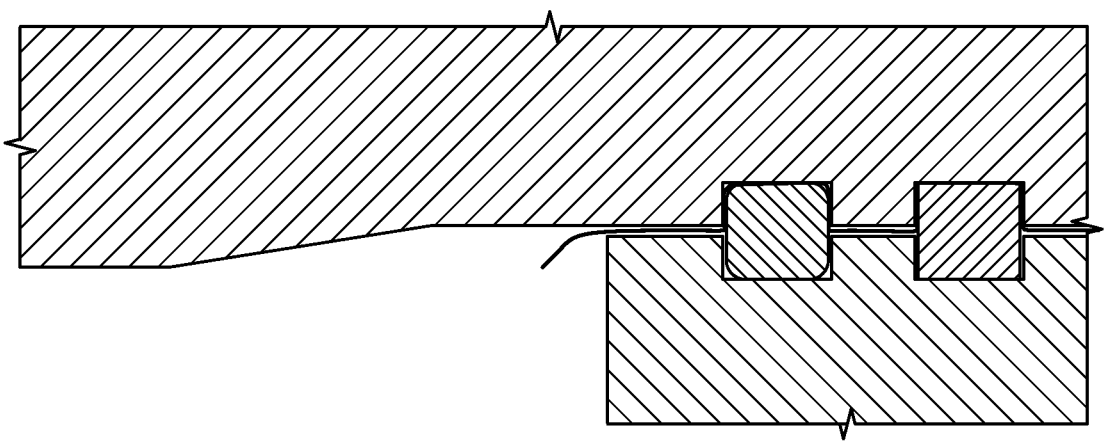
Figure 2C:
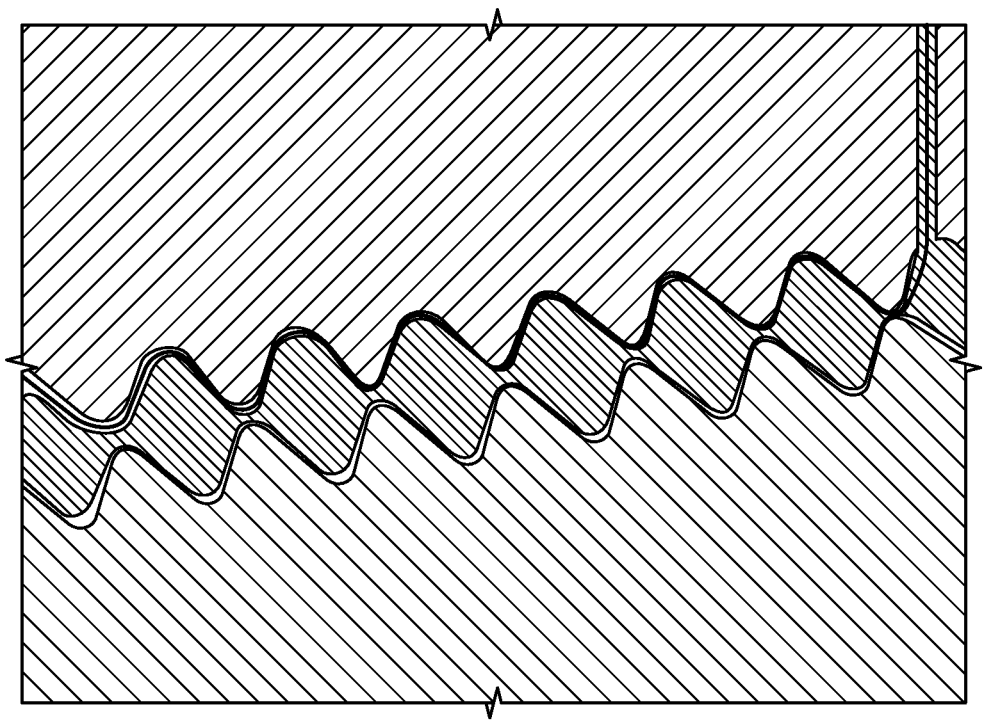

Typically, RTR pipes are rigid and can not be spooled. Additionally, the RTR pipes have to be transported from the manufacturing plant to the work site. Due to transportation limitations, a length of the RTR pipes is typically limited to about 30 feet (10-12 meters). Based on the length of the RTR pipes, a significant number of RTR pipe joints are needed to ensure efficient fluid transportation in the RTR pipes. As there are a significant number of RTR pipe joints, there is a significant risk for failure to occur in the RTR pipe joints failure. For example, typical failure mechanisms of RTR pipe joints are illustrated in FIGS. 2A-2C. For example, a poor installation can result in imperfections or cavities along the contact surface between the spigot and the socket. FIG. 2A illustrates a failure in a threaded joint (i.e., the joints 100 and 110), FIG. 2B illustrates a failure in a key-lock joint (i.e., the joint 120), and FIG. 2C illustrates a failure in an injected mechanical joint (i.e., the joint 130). In operation, fluid (e.g., water) at high pressure and high temperature could ingress into these cavities (step #1) and create a high pressure fluid film (step #2) which would slowly propagate along the spigot-socket interface. In some cases, the creep of the resin at the interface can aggravate the water propagation at the interface. As the ingress progresses, the contact pressure on the initial threads is eliminated and the excess load is transferred to the nearby threads, which eventually leads to overloading failure.

Conventional methods and systems for installation of RTR joints in the oil and gas industry is a complex process highly based on an operator's skill and may need an entire team of operators. For example, the operator(s) need to plan, consider, and overcome various challenges in installation such as: joint preparation; sanding or tapering of the pipe end; size of the sanding area; curing time dependent on local temperature and hygrometry; in the case of laminated joints, lamination is applied within 2 hours after sanding and re-sanding will be required after passing the two hours; use of correct resin mix ration; sweet sand to be used for backfilling; good compaction of the soil; and environmental conditions for maintenance and installation teams which may lead to improperly makeup joints because of, for example, approximative centering. As a result, conventional methods and systems for installation of RTR joints are prone to human errors resulting in improper or poor workmanship (i.e., surface preparation, joint misalignment, lack of adhesive, etc.), improper or poor soil back filling with no good compaction, missing thrust blocks, narrow difference between RTR pipe design pressure and the surge pressure of fire water pump, heavy truck movements on or near to the buried RTR piping network, expensive damage, and increased non-productive time (NPT). In addition, when factored with the large number of connections needed, the various sources of RTR joint failure lead to a high joint failure frequency that mobilize important resources to fix the pipelines. In some cases, more than 95% of RTR pipeline failures happen at the joint location.

Additionally, pipelines may be installed in remote/desert areas where temperatures can be extreme. Using thermosetting resins to perform sealing requires a thorough control of the temperature and hygrometry prior to and during the curing. Temperature and humidity conditions potentially hinder the process of epoxy curing within the joint, limiting the productivity of the installation team. For this reason, thermoplastic welding through electrofusion or induction is preferred as local temperature and hygrometry have low impact on this type of welding. Further, a lack automated jointing technology to support operators in their difficult environment contributes to keeping the rate of RTR joints failures high. As such, conventional methods and systems for installation of RTR joints have a high rate of failure in the RTR joints.

One or more embodiments in the present disclosure may be used to overcome such challenges as well as provide additional advantages over conventional methods and systems for installation of RTR joints. For example, in some embodiments, an automated installation of RTR joints system disclosed herein includes an induction welding system and a hydraulic/pneumatic caterpillar-like device working in conjunction with a computer system to streamline and improve efficiency as compared with conventional methods and systems for installation of RTR joints due, in part, to reducing or eliminating human interaction with the RTR joints by automating installation operations, monitoring, and alerts. The induction welding system and the hydraulic/pneumatic caterpillar-like device may streamline and improve efficiency by performing positioning, alignment, and induction welding of the RTR joint ends to reduce a risk of failure in the RTR joints. For example, the hydraulic/pneumatic caterpillar-like device integrates a series of pneumatic wheels and hydraulic arms to perform the positioning and alignment of the RTR joints and also assists the induction welding system during welding. Additionally, with the pneumatic wheels and hydraulic arms, the hydraulic/pneumatic caterpillar-like device may axially move along the pipeline from one joint to another which makes the automated installation of RTR joints system autonomous and less reliable on human intervention.

Therefore, one or more embodiments of the present invention relate to a system and method for automatically or semi-automatically jointing of reinforced thermosetting resin (RTR) pipes. In one aspect, embodiments disclosed herein relate to automated an installation of RTR joints in, for example, the oil and gas industry, to reduce, and potentially eliminate, failures and increase the confidence in the RTR pipe technology. More specifically, embodiments disclosed herein relate to an automated installation of RTR joints system having an induction welding system (hereafter called an inductor) and a hydraulic/pneumatic caterpillar-like device (hereafter called a pig) for automated in-field installation of RTR pipes. For example, the inductor may be fitted on an outside of RTR joint. Additionally, the pig may be inserted inside the pipeline and remotely controlled to assist operators during the alignment of the pipes and subsequent joint making/welding. Through the successive inflation and deflation of pneumatic wheels placed along the pig, the pig may autonomously move inside the RTR pipeline (from one RTR joint to the other) during the installation, while also be used to apply internal pressure at specific locations of the pipe, as needed, during installation. Overall, the automated installation of RTR joints system disclosed herein minizines human interaction with the RTR pipes, provides automated and accurate positioning and alignment of the to-be-jointed RTR pipes, and provides automated and accurate makeup of thermoplastic welded RTR pipe connections.

Figure 3A:
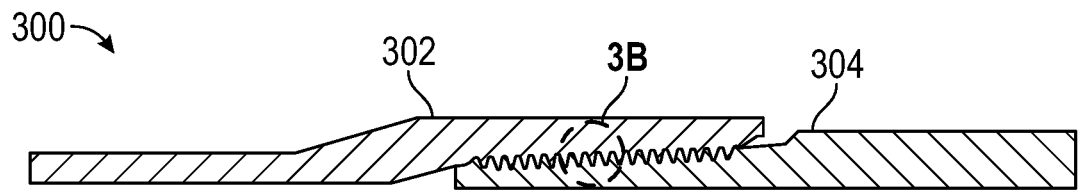
FIGS. 3A-3B are schematic cross-section representations of an integral threaded-welded RTR joint in accordance with one or more embodiments of the present disclosure.
Figure 3B:
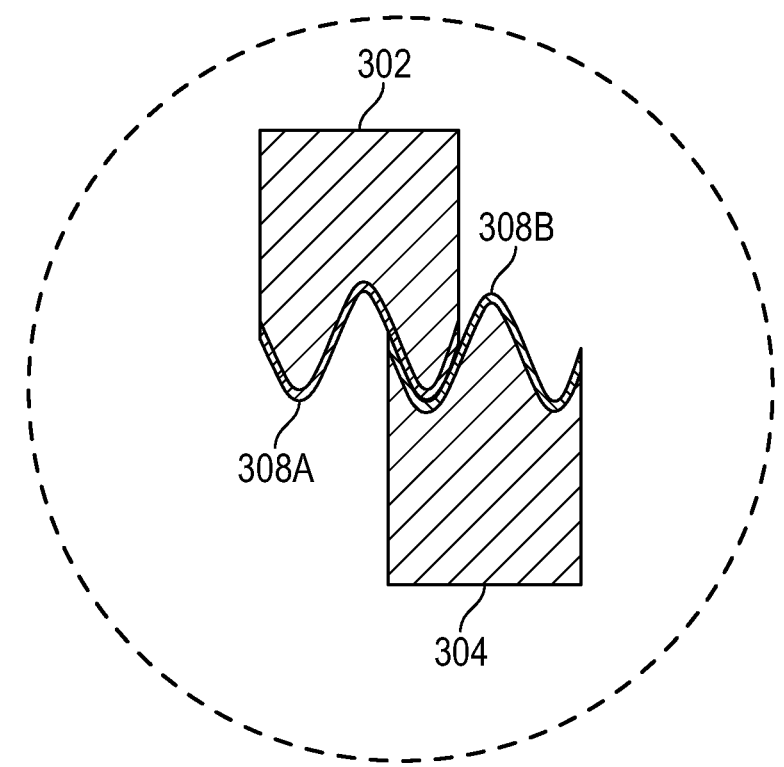

An exemplary system in accordance with one or more embodiments is schematically presented in FIGS. 3A and 3B. As can be seen, an integral threaded-welded RTR joint 300 is being formed between a first RTR pipe 302 with a threaded socket end (i.e., box end) and a second RTR pipe 304 with a threaded spigot end (i.e., pin end). As shown in the close up of dotted circle 3B, the threaded socket end may be coated with a tie layer comprising at least a thermoplastic material (tie layer A) 308A. Additionally, the threaded spigot end may be coated with a tie layer comprising at least a thermoplastic material (tie layer B) 308B. To make-up the integral threaded-welded RTR joint 400, the threaded spigot end is threaded into the threaded socket end such as the two tie layers 308A, 308B are compressed against each other followed by thermoplastic welding of the two tie layers 308A, 308B using induction welding process.

The main role of the two tie layers 308A, 308B is to enable the permanent interlock (by welding) of the spigot and socket ends after the thread making. This should provide a permanent sealing solution and additional strength to the overall integral threaded-welded RTR joint 300. Accordingly, in one or more embodiments, the two tie layers 308A, 308B are thermoplastic-based. In addition, as most thermoplastics are non-conductive, the tie layers may also include one or more susceptor layers (e.g., in the form of inclusions) to provide the necessary heat (absorbed during the induction) for the welding of the tie layer 308A to the tie layer 308B. Additionally, the susceptor layers are often made of silicon carbide, molybdenum, graphite, stainless steel, aluminum, and other conductive materials. It is important to note that in this configuration, the susceptor layer will be at the contact surface between the two tie layers 308A, 308B and, therefore, a single susceptor could be sufficient. Therefore, the opposite faying surface can simply be made of a pure thermoplastic tie layer (without susceptor).

Figure 4:
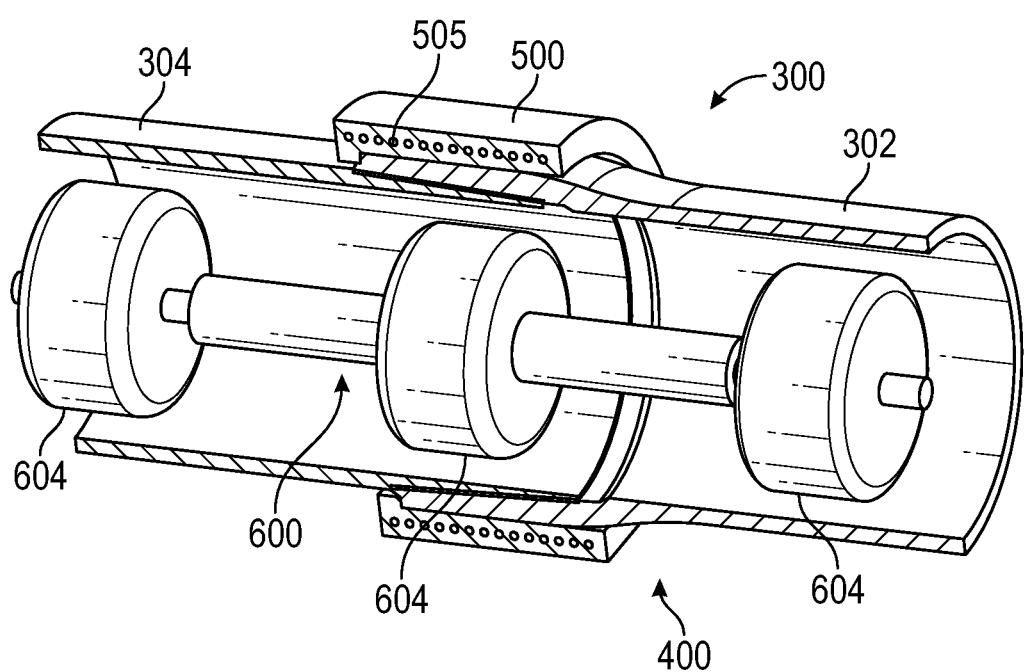
FIG. 4 is a schematic representation of an automated installation of RTR joints system in accordance with one or more embodiments of the present disclosure.

Now referring to FIG. 4, in one or more embodiments, an automated installation of RTR joints system 400 is used to makeup the integral threaded-welded RTR joint 300. The automated installation of RTR joints system 400 includes an inductor 500 and a pig 600. The inductor 500 is positioned around the integral threaded-welded RTR joint 300 for induction welding towards to the two tie layers (308A, 308B). For example, the inductor 500 includes induction coils 505 to heat and melt the two tie layers (308A, 308B) together to form a weld after the two tie layers (308A, 308B) cool. The pig 600 is inserted into the integral threaded-welded RTR joint 300 to adjust an alignment of the two pipes 302, 304 prior to the makeup. For example, the pig 600 includes a plurality of pneumatic wheels (604, 605, 606) on a frame to adjust a position of the two pipes 302, 304 such that the two pipes 302, 304 are coaxial. While the automated installation of RTR joints system 400 is shown being used on the integral threaded-welded RTR joint 300, this is merely for example purposes only and the automated installation of RTR joints system 400 may be used on type of RTR joint.

As schematically shown in FIGS. 5A-5D, the inductor 500 of the automated installation of RTR joints system (400) is used for thermoplastic welding of the integral threaded-welded RTR joint (300). The inductor 500 uses the induction coils 505 to generate induction heating along the spigot-socket thread interface. This will eventually lead to melting, solidification, and complete fusion between the two tie layers (308A, 308B). Those skilled in the art will readily appreciate that the induction welding process parameters (e.g., power, frequency, heating time, etc.) can be properly determined for different situations based on laboratory experiments and numerical simulation results. Depending on the thermoplastic resin used for the tie layers, a controlled cooling may be required. PEEK, for example, can become very brittle, if the heating/cooling is not controlled. High crystallinity will lead to a more brittle tie-layer. A toughened thermoplastic or elastomer will be more flexible and absorb such local deformation and loadings.

As shown in FIGS. 5A-5D, the inductor 500 includes a first ring 501 and a second ring 502 movably coupled to each other. For example, a hinge 503 may couple the first ring 501 to the second ring 502 such that the inductor 400 may be moved from the open to the closed position. By having the open and closed position, an operator is able to fit the inductor 500 to any threaded socket end (302) or a coupler. Additionally, each of the first ring 501 and the second ring 502 may include an internal groove 504 to wedge the inductor 500 against an extremity of the RTR joint. Further, the induction coils 505 are embedded in each of the first ring 501 and the second ring 502 to use during the process of induction welding to heat susceptors located at the interface of the two thermoplastic layers located respectively on the pin end (e.g., spigot end) and the box end (e.g., socket end).

Figure 5A:
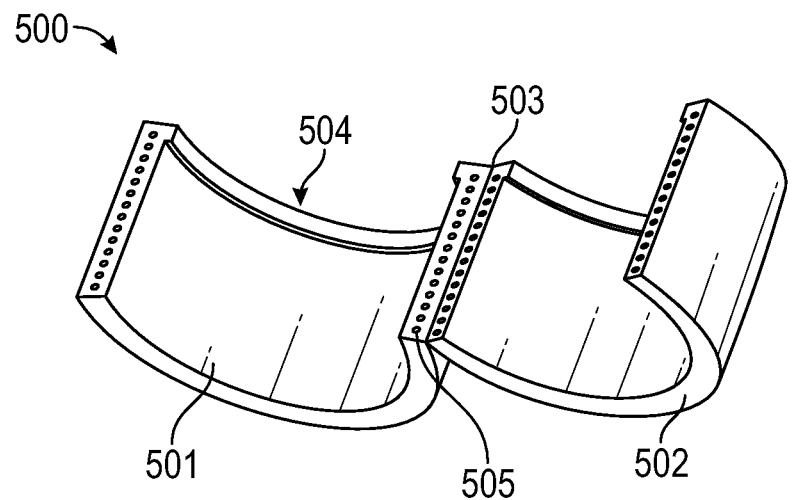
FIGS. 5A-5D are schematic cross-section representations of an induction welding system (inductor) in accordance with one or more embodiments of the present disclosure.
Figure 5B:
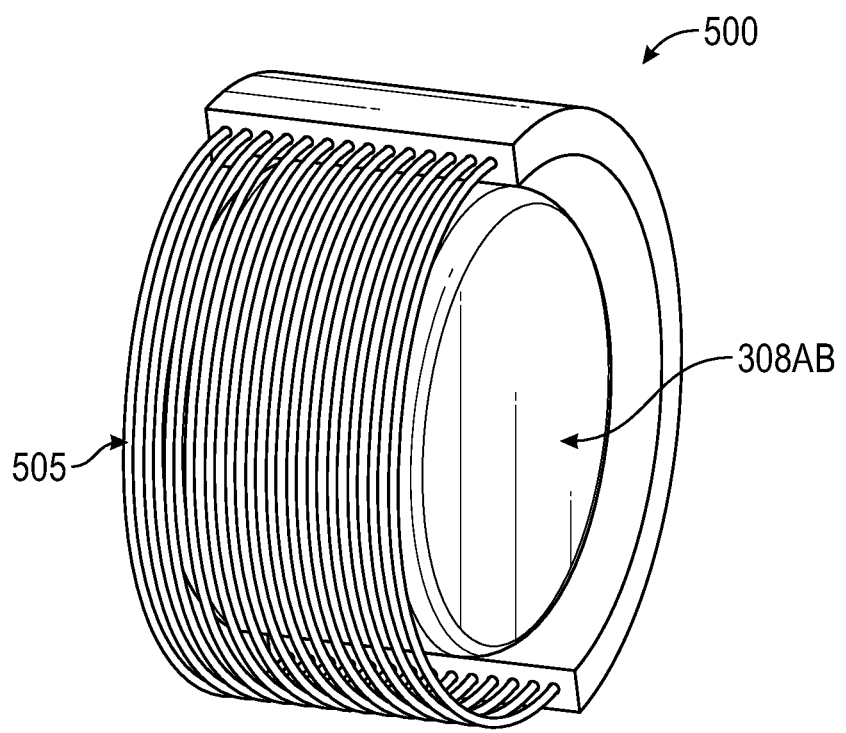
Figure 5C:
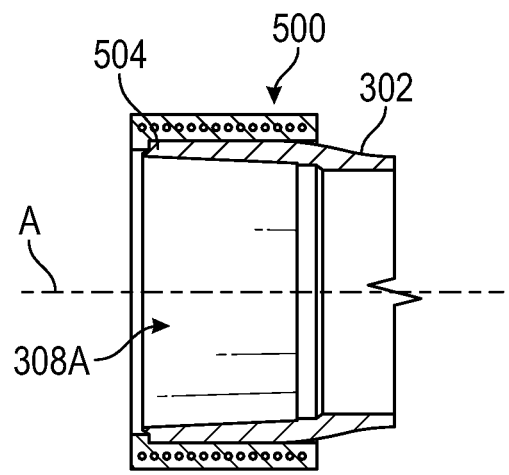
Figure 5D:
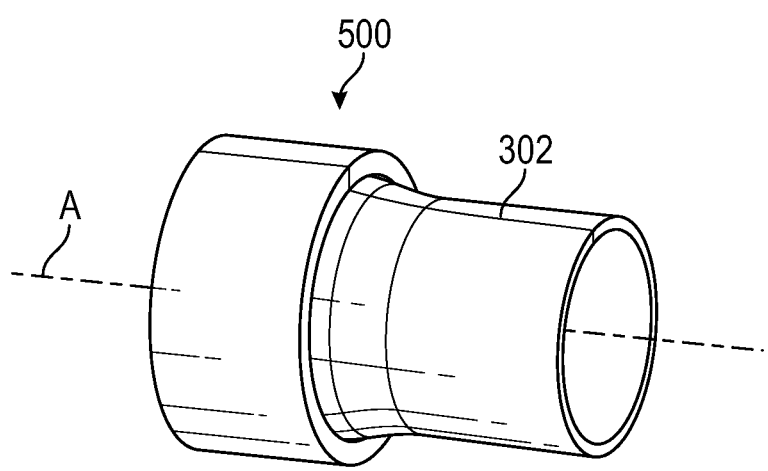

In FIG. 5A, the inductor 500 is illustrated in the open position ready to be fitted around a pipe end. As shown in FIGS. 5B-5D, the inductor 500 is moved to the closed position such that the first ring 501 and the second ring 502 couple around a pipe (such as the first RTR pipe 302) to be coaxially with a pipe axis A. Additionally, the internal groove 504 runs on a circumference of the inductor 500 at one end to wedge (See FIG. 5C) with a box end (e.g., socket end) so that the induction coils 505 are well positioned along the pipe axis A and the tie layer 308A. In some embodiments, circumferential straps may be used to fix the inductor 500 on the box end (e.g., socket end). In this position, the induction coils 505 are aimed to heat (See FIG. 5B) a susceptor layer 308AB placed at an interface of the two tie layers along the spigot-socket thread interface. This will eventually lead to melting, solidification, and complete fusion between tie layers (308A, 308B).

Figure 6A:
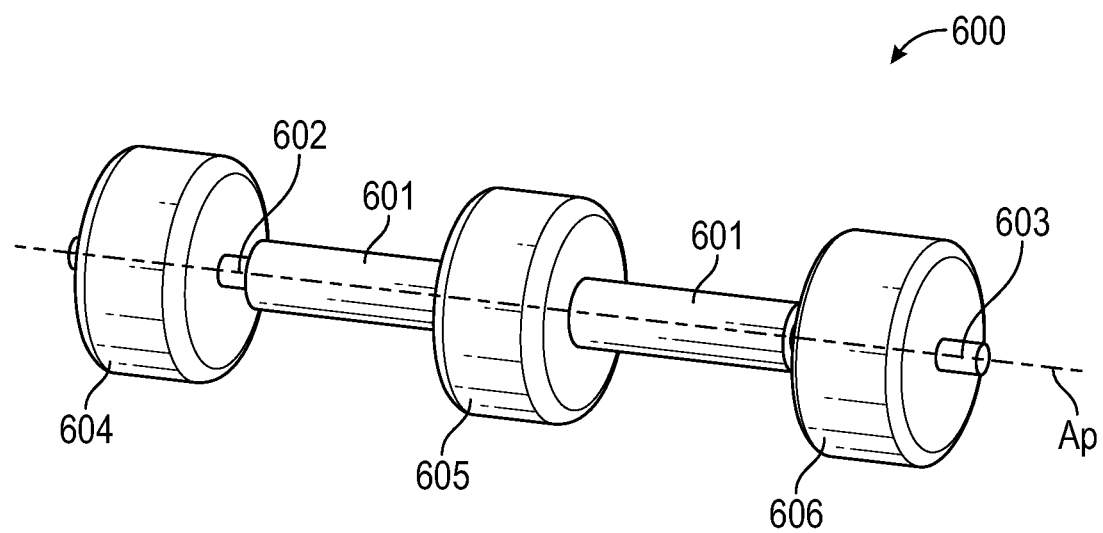
FIGS. 6A-6E are schematic cross-section representations of a hydraulic/pneumatic caterpillar-like device (pig) in accordance with one or more embodiments of the present disclosure.

As schematically shown in FIG. 6A, the pig 600 of the automated installation of RTR joints system (400) is includes a frame extending axially along an axis Ap. The frame is made of a central hydraulic piston 601 and two telescopic arms (602, 603). For example, the piston 601 may be a central hydraulic piston with a first telescopic arm 602 extends axially outward from one end and a second telescopic arm 603 extends axially outward from an opposite end. Each telescopic arm 602, 603 may each include a plurality of tubulars sliding in and out from another to shorten (i.e., folded) or lengthen (i.e., unfolded) each telescopic arm 602, 603. For example, each telescopic arm 602, 603 may be unfolded through pneumatic pressure applied inside the piston 601 via one or several compressors embedded in or attached to the piston 601. Alternatively, compressed fluid (e.g., air) may be supplied via one or several hoses connected to an external source and controlled by the operators. Additionally, the first telescopic arm 602 and the second telescopic arm 603 may be moved independently from each other. It is further envisioned that each telescopic arm 602, 603 may have several nested tubes to allow for further unfolding.

In one or more embodiments, a plurality of pneumatic wheels (604, 605, 606) are provided on the frame. For example, a first pneumatic wheel 604 (i.e., left pneumatic wheel) is mounted on the first telescopic arm 602, a second pneumatic wheel 605 (i.e., central pneumatic wheel) is mounted on the piston 601, and a third pneumatic wheel 606 (i.e., right pneumatic wheel) is mounted on the second telescopic arm 603. Additionally, each pneumatic wheel (604, 605, 606) may be individually inflated and deflated on demand via embedded compressors in the piston 601, the telescopic arms 602, 603, and/or the pneumatic wheels themselves. The pressure inside each pneumatic wheel (604, 605, 606) is controlled to allow on demand inflation and deflation. Further, each pneumatic wheel (604, 605, 606) may have a cylindrical shape with a flat circumferential profile to allow a good fit within the pipes when inflated. It is further envisioned that an external texture of each pneumatic wheel (604, 605, 606) may be designed to naturally offer a good tangential friction coefficient with an internal surface of the pipes.

Now referring to FIGS. 6B-6E, in one or more embodiments, the pig 600 is illustrated assisting in the makeup of the two pipes 302, 304 of the integral threaded-welded RTR joint 300. For example, the pig 600 may first be used to adjust the alignment of the two pipes 302, 304, prior to the makeup. Initially, the inductor 500 may be first be placed on a fixed pipe (i.e., the pipe already in position, box or pin, depending on installation).

Figure 6B:
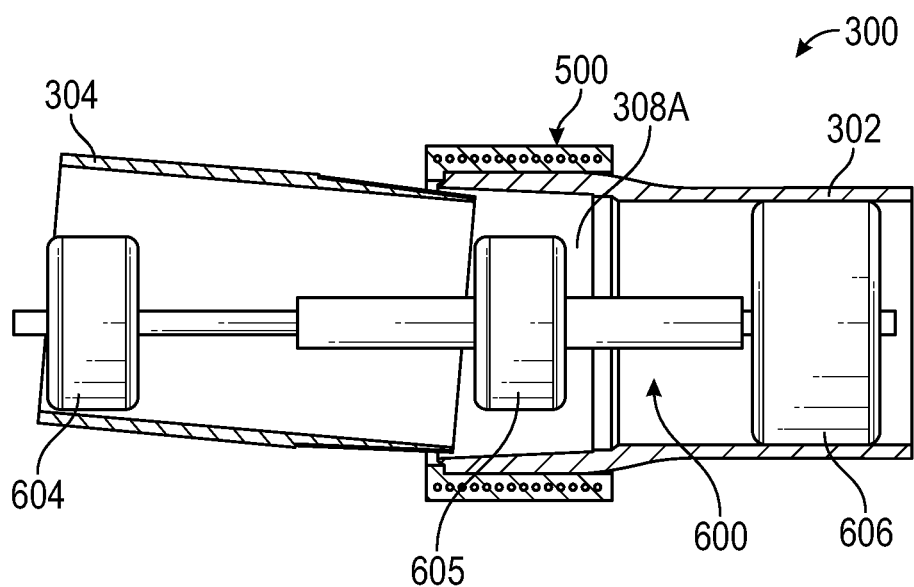

In FIG. 6B, the pig 600 is first placed in an end of the first RTR pipe 302 (i.e., the fixed pipe). For example, the third pneumatic wheel 606 is inserted into the fixed pipe, the second pneumatic wheel 605 is positioned within the tie layer 308A, and the first pneumatic wheel 604 is positioned outside of the first RTR pipe 302. Next, the second RTR pipe 304 (i.e., a moving pipe) is approached to the first RTR pipe 302 such that the first pneumatic wheel 604 is inserted into an end of the second RTR pipe 304. Additionally, the third pneumatic wheel 606 is inflated up to a predetermined pressure that will cause the remainder of the pig 600 to be suspended.

Figure 6C:
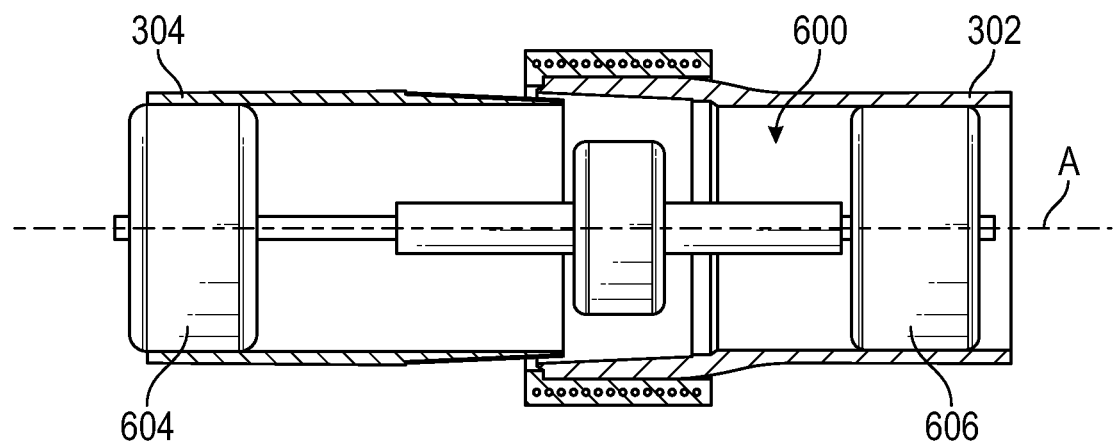

In FIG. 6C, with the pig 600 suspended, the first pneumatic wheel 604 is progressively inflated. As the first pneumatic wheel 604 progressively inflates, the second RTR pipe 304 begins to align with the first RTR pipe 302. For example, once the first pneumatic wheel 604 is fully inflated, the second RTR pipe 304 places itself in alignment with the first RTR pipe 302. In alignment, the first RTR pipe 302, the second RTR pipe 304, and the pig 600 will be coaxial about the axis A.

Figure 6D:
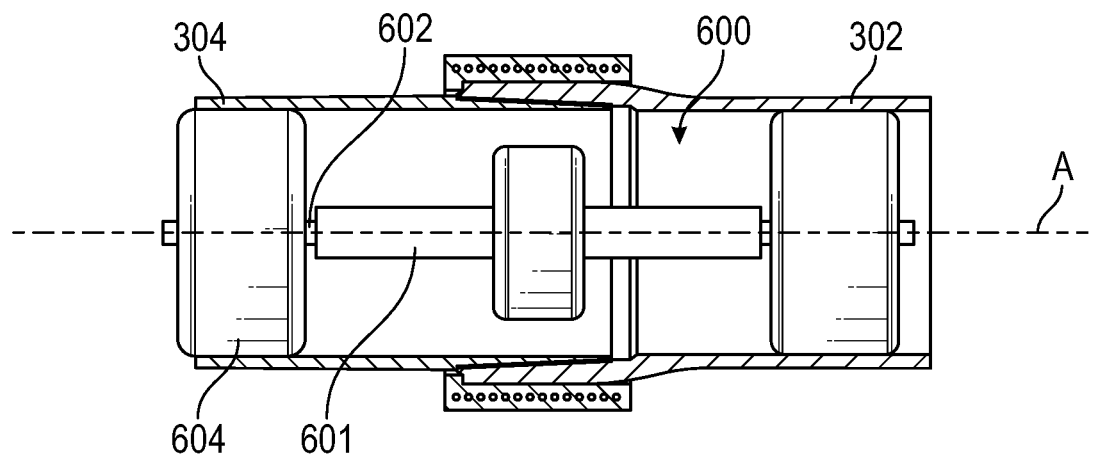

In FIG. 6D, with the first RTR pipe 302 and the second RTR pipe 304 aligned, the pig 600 contracts the first telescopic arm 602 within the piston 601. This allows the two pipes 302, 304 to interpenetrate. For example, As the first telescopic arm 602 contracts, the first pneumatic wheel 604 may move the second RTR pipe 304 to insert the spigot end into the socket end.

Figure 6E:
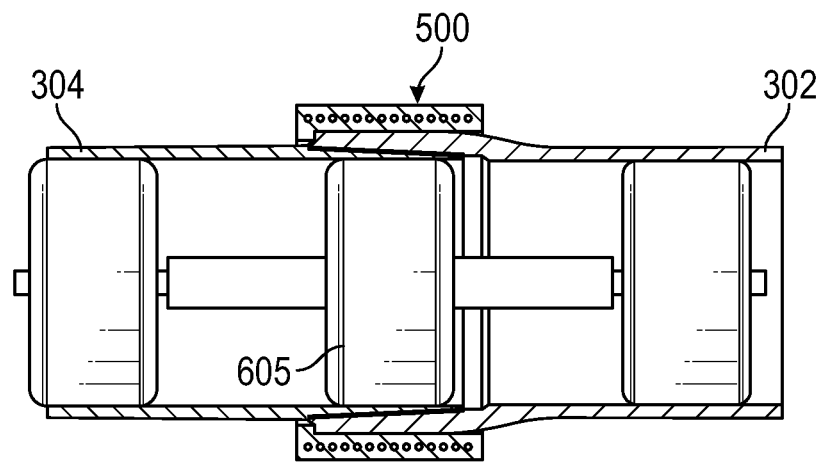

As shown in FIG. 6E, with the first RTR pipe 302 and the second RTR pipe 304 made up together, the second pneumatic wheel 605 is inflated. When inflated, the second pneumatic wheel 605 may maintain an internal pressure during a cooldown of the thermoplastic sealing of the tie layers of the first RTR pipe 302 and the second RTR pipe 304. For example, during the induction or electrofusion welding of the thermoplastic interlayer with the inductor 500, the pig 600 optionally inflates the second pneumatic wheel 605 to apply an internal pressure at the sealing location. The applied internal pressure ensures that a correct pressure is maintained during the cooldown of the thermoplastic sealing. In some embodiments, the inductor 500 may be wirelessly connected to the pig 600 to synchronize the welding with the internal pressure application profile.

In some embodiments, the pig 600 may be used in conjunction with a cargo-crane truck, flexibles straps, adjustable pipe stand, or any tool to lift a pipe for alignment. An exemplary system of the pig 600 in conjunction with a crane 700 in accordance with one or more embodiments is schematically presented in FIGS. 7A-7E.

Figure 7A:
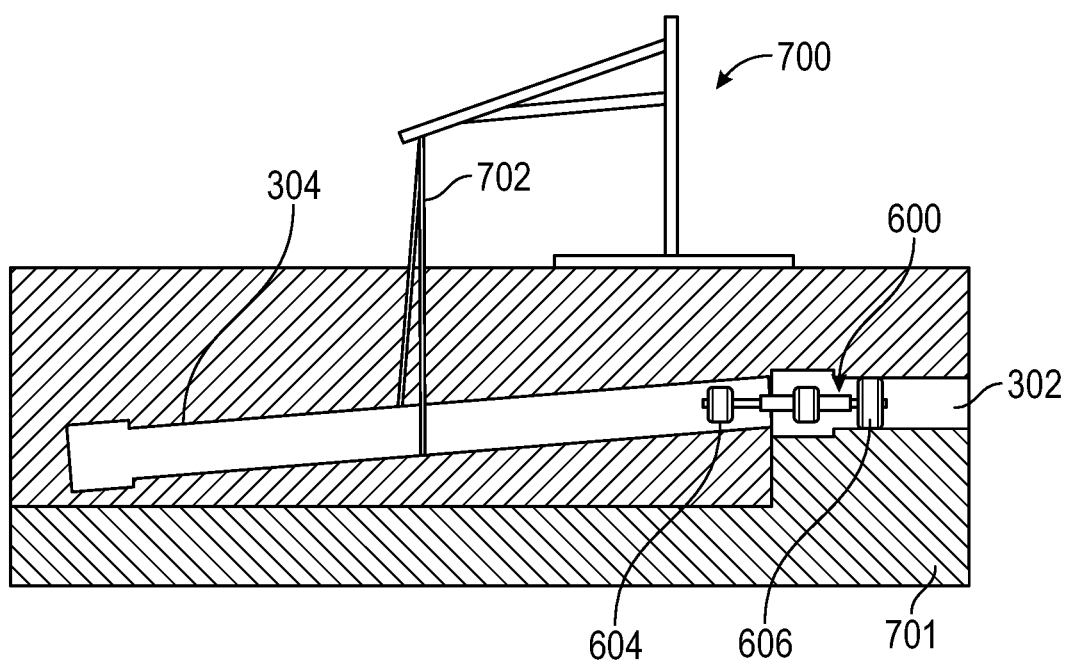
FIGS. 7A-7E are schematic cross-section representations of using the pig in accordance with one or more embodiments of the present disclosure.

In FIG. 7A, the first RTR pipe 302 is set in position on a surface 701. The surface 701 may be the ground at which the pipeline will be buried on. The pig 600 is first placed in an end of the first RTR pipe 302. For example, the third pneumatic wheel 606 is inserted into the first RTR pipe 302 and the second pneumatic wheel 605 is positioned within the tie layer 308A. Additionally, the third pneumatic wheel 606 is inflated up to a predetermined pressure that will cause the remainder of the pig 600 to be suspended within the first RTR pipe 302. Next, a cable system 702 of the crane 700 lift the second RTR pipe 304 to approach the first RTR pipe 302. The first pneumatic wheel 604 is deflated such the pig 600 is also inserted into an end of the second RTR pipe 304.

Figure 7B:
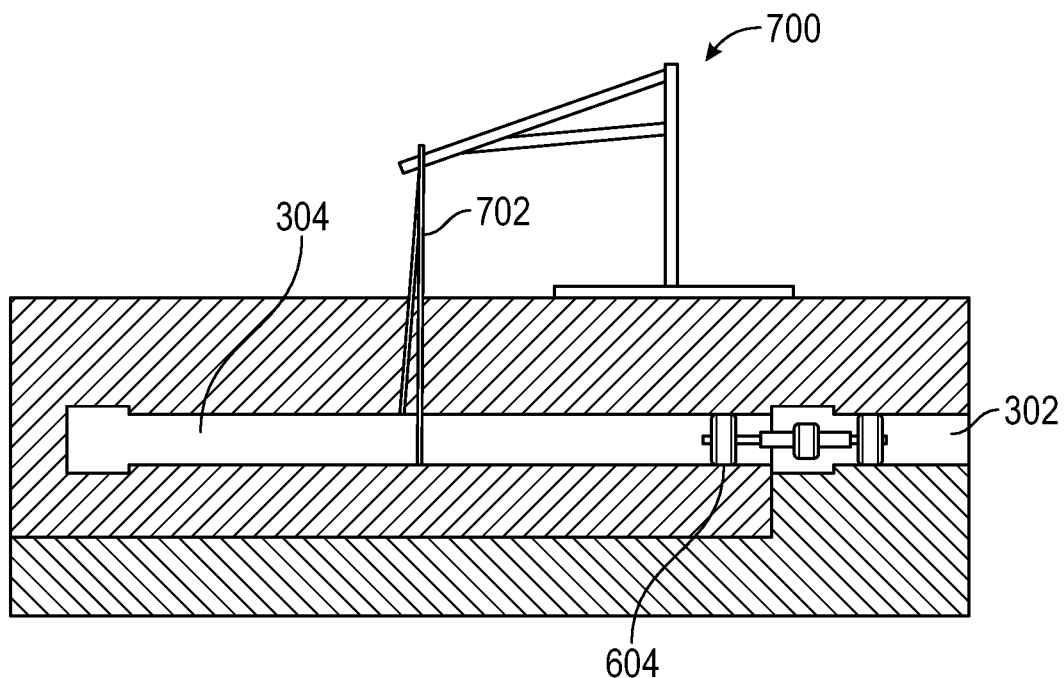

In FIG. 7B, the first pneumatic wheel 604 is inflated. The inflated first pneumatic wheel 604 provides a momentum to the second RTR pipe 304 such that the second RTR pipe 304 is moved towards a coaxially centered position with the first RTR pipe 302. For example, as the first pneumatic wheel 604 progressively inflates, the second RTR pipe 304 begins to align with the first RTR pipe 302. In some embodiments, a movement of the second RTR pipe 304 may be assisted by the crane 700 and the cable system 701 (or spring-back system) to support the weight of the second RTR pipe 304 and facilitate centering.

Figure 7C:
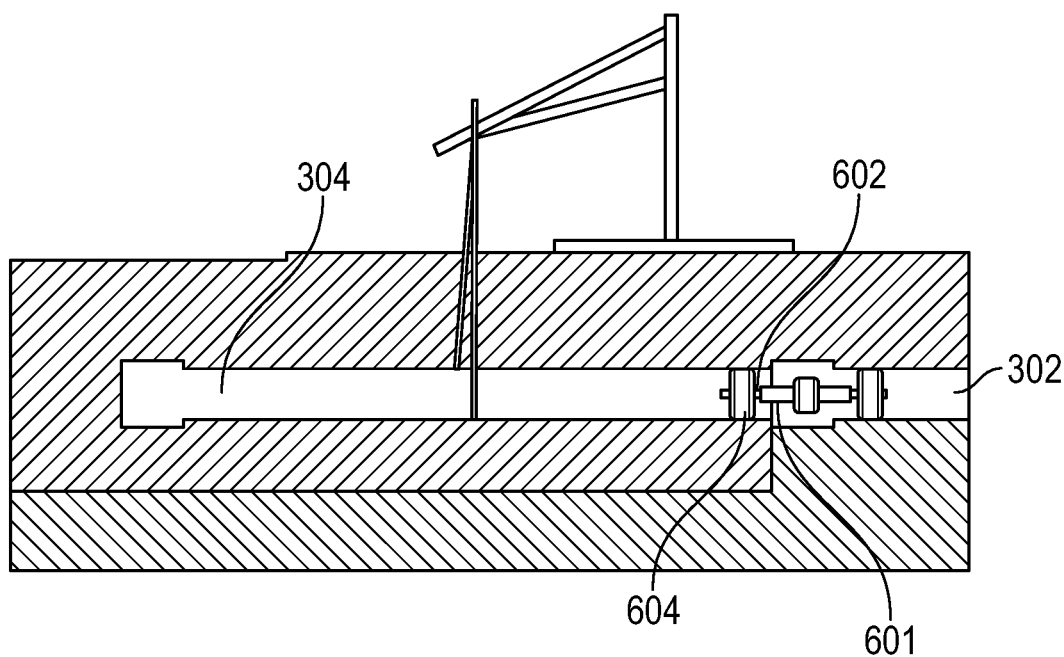

In FIG. 7C, with the first RTR pipe 302 and the second RTR pipe 304 aligned, the first telescopic arm 602 folds into the piston 601. Through friction between the second RTR pipe 304 and the first pneumatic wheel 604, the first telescopic arm 602 pulls the spigot end of the second RTR pipe 304 into the socket end of the first RTR pipe 302.

Figure 7D:
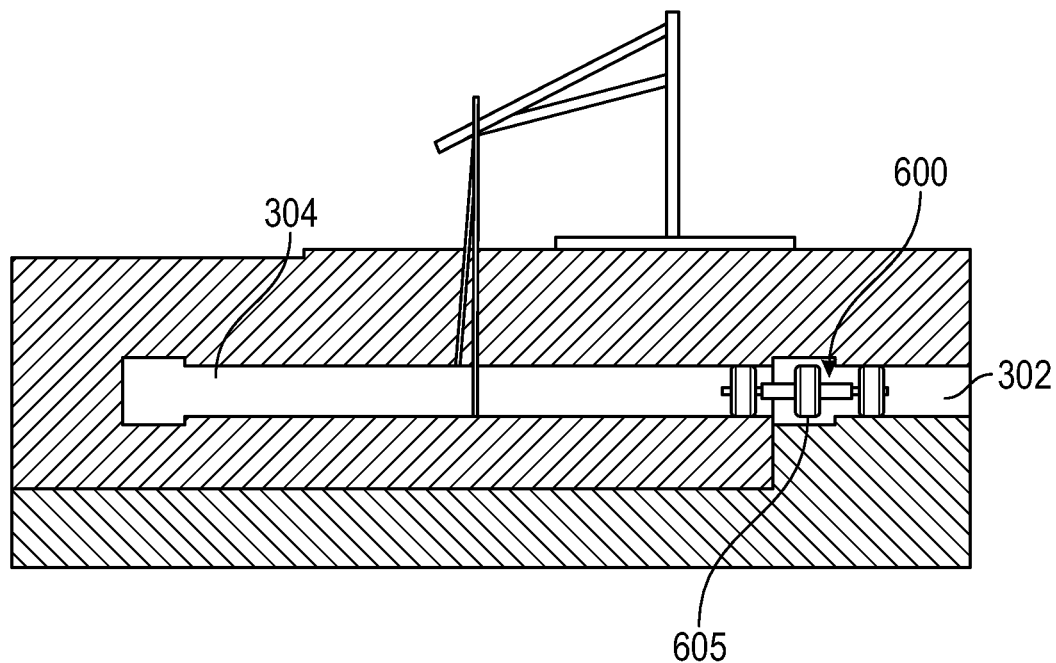

In FIG. 7D, with the first RTR pipe 302 and the second RTR pipe 304 made up together, the pig 600 may provide an internal pressure at the level of the thermoplastic sealing to optimize performance after cooldown. For example, the second pneumatic wheel 605 is inflated to apply an internal pressure at the thermoplastic sealing location. In some embodiments, the pig 600 may include a induction welding device and conduct the welding from inside the pipes 302, 304. For example, a heating device embedded or on the second pneumatic wheel 605 may provide heat to the thermoplastic sealing location.

Figure 7E:
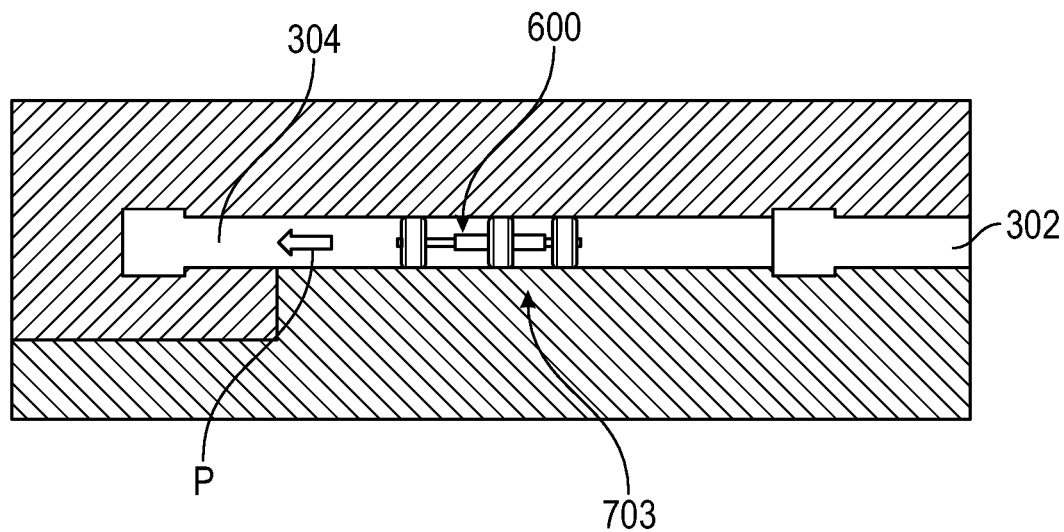

In FIG. 7E, after welding is properly completed, the pig 600 axially moves through the pipes 302, 304. For example, the pig 600 may travel through (see arrow P) the second RTR pipe 304 towards the next joint to be made. Additionally, ground 703, such as dirt, may be filled under the second RTR pipe 304.

Now referring to FIGS. 8A-8G, an exemplary system of the pig 600 moving a pipeline 800 in accordance with one or more embodiments is schematically presented. For example, the capability of the inflating-deflating pneumatic wheels (604, 605, 606) and the folding-unfolding the telescopic arms (602, 603) are operated to provide an autonomous axial motion of the pig 600 within the pipeline 800. The pig 600 may autonomously move from one connection/joint to the next one within the pipeline 800. The autonomous movement of the pig 600 enables the pig 600 to perform several alignment and connection makeup, while staying inside the pipeline 800.

Figure 8A:
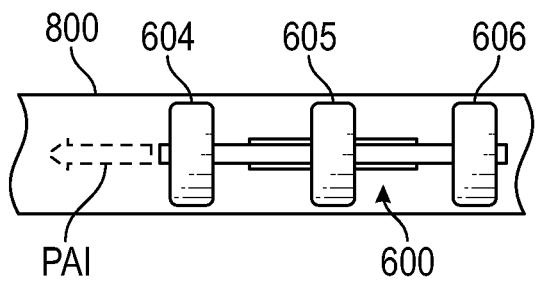
FIGS. 8A-8G are schematic cross-section representations of moving the pig in accordance with one or more embodiments of the present disclosure.
Figure 8B:
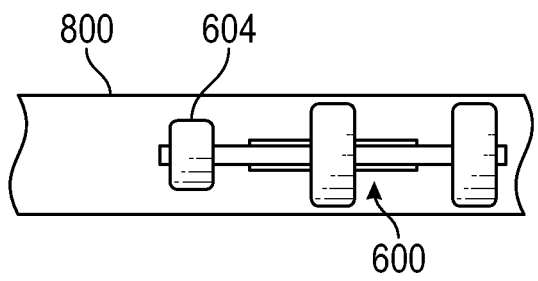
Figure 8C:
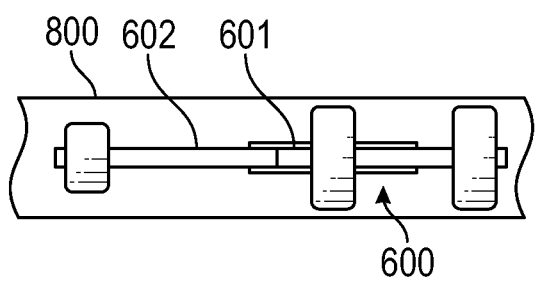
Figure 8D:
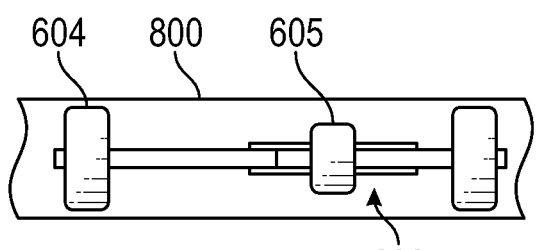
Figure 8E:
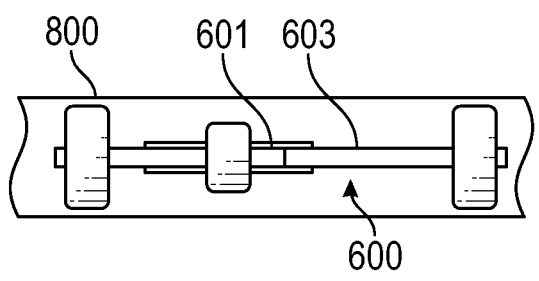
Figure 8F:
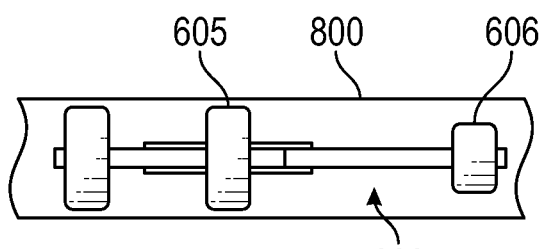
Figure 8G:
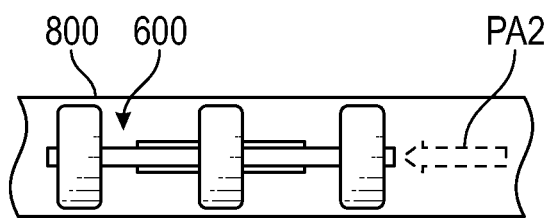

As shown in FIG. 8A, in an initial position, the first pneumatic wheel 604, the second pneumatic wheel 605, and the third pneumatic wheel 606 are all inflated. The arrow PA1 represents a movement direction of the pig 600 for the next translation increment. In first step, as shown in FIG. 8B, the first pneumatic wheel 604 is deflated. Next, as shown in FIG. 8C, the first telescopic arm 602 is unfolded to extend outwardly from the piston 601. Then, the first pneumatic wheel 604 is inflated and the second pneumatic wheel 605 is deflated, as shown in FIG. 8D. In FIG. 8E, the second telescopic arm 603 is unfolded to extend outwardly from the piston 601 while the first telescopic arm 602 is folded. Now, the second pneumatic wheel 605 is inflated and the third pneumatic wheel 606 is deflated, as shown in FIG. 8F. Finally, as shown in FIG. 8G, the second telescopic arm 603 is folded, and each of the pneumatic wheels (604, 605, 606) are fully inflated. The arrow PA2 represents a full movement direction of the pig 600 to the next translation increment movement. The steps illustrated in FIGS. 8A-8G may be repeated as needed to start new translation increment movement cycles and continue moving the pig 600 along the pipeline.

Figure 9A:
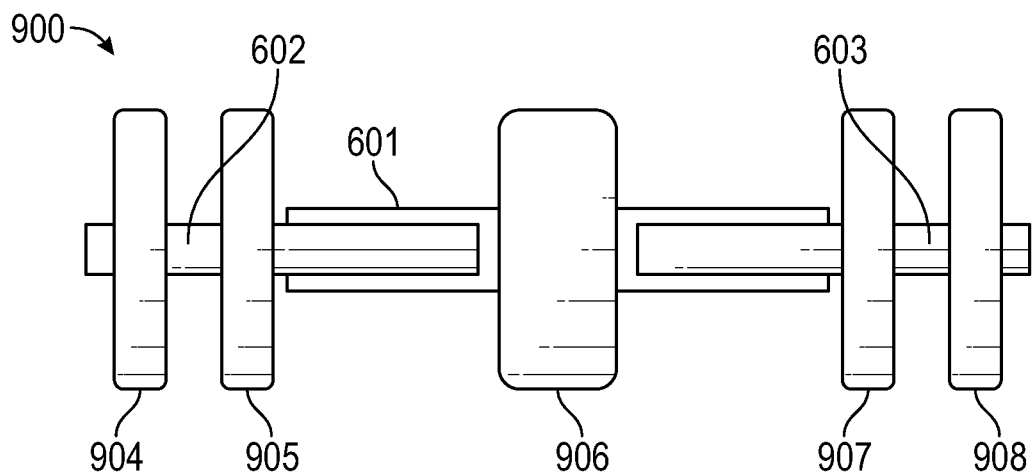
FIGS. 9A-9C are schematic cross-section representations of a pig in accordance with one or more embodiments of the present disclosure.

Referring now to FIG. 9A, another embodiment of a pig 900 according to embodiments herein is illustrated from a side end view, where like numerals represent like parts. The embodiment of FIG. 9A is similar to that of the embodiment of FIG. 6A. However, instead having three pneumatic wheels, the pig 900 may have five pneumatic wheels. For example, a first pneumatic wheel 904 and a second pneumatic wheel 905 may be mounted on the first telescopic arm 602, a third pneumatic wheel 906 may be mounted on the piston 601, and a fourth pneumatic wheel 907 and a fifth pneumatic wheel 908 may be mounted on the second telescopic arm 603. Having two pneumatic wheels (904, 905, 907, 908) on each of the telescopic arms (602, 603) may increase stability and coaxial centering precision. During the unfolding of each of the telescopic arms (602, 603), one of the several pneumatic wheels may move slower than unfolding tube of the telescopic arm so that the one pneumatic wheel does not translate as much as the tube and finally locate in a location that will bring more stability to the pig 900.

Figure 9B:
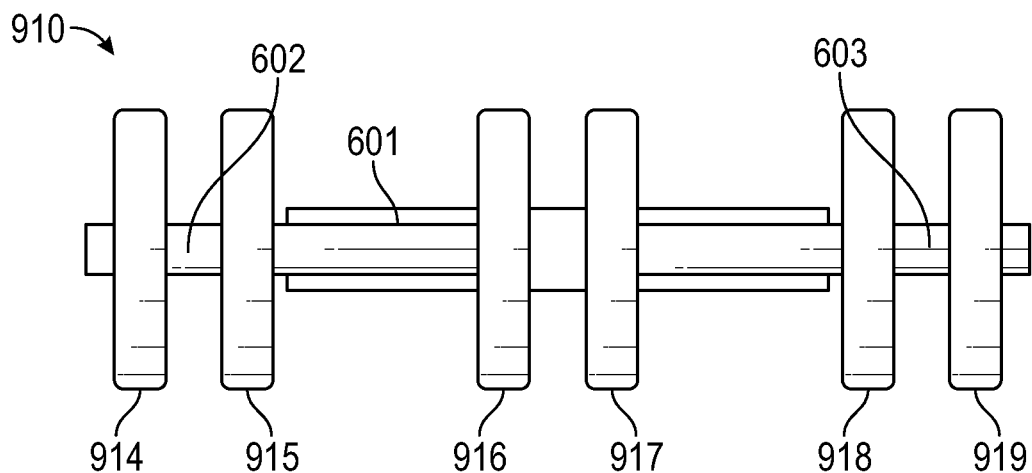

Referring now to FIG. 9B, another embodiment of a pig 910 according to embodiments herein is illustrated from a side end view, where like numerals represent like parts. The embodiment of FIG. 9B is similar to that of the embodiment of FIG. 6A. However, instead having three pneumatic wheels, the pig 910 may have six pneumatic wheels. For example, a first pneumatic wheel 914 and a second pneumatic wheel 915 may be mounted on the first telescopic arm 602, a third pneumatic wheel 916 and a fourth pneumatic wheel 917 may be mounted on the piston 601, and a fifth pneumatic wheel 918 and a sixth pneumatic wheel 919 may be mounted on the second telescopic arm 603. Having two pneumatic wheels (916, 917) on the piston 601 may increase stability and coaxial centering precision.

Figure 9C:
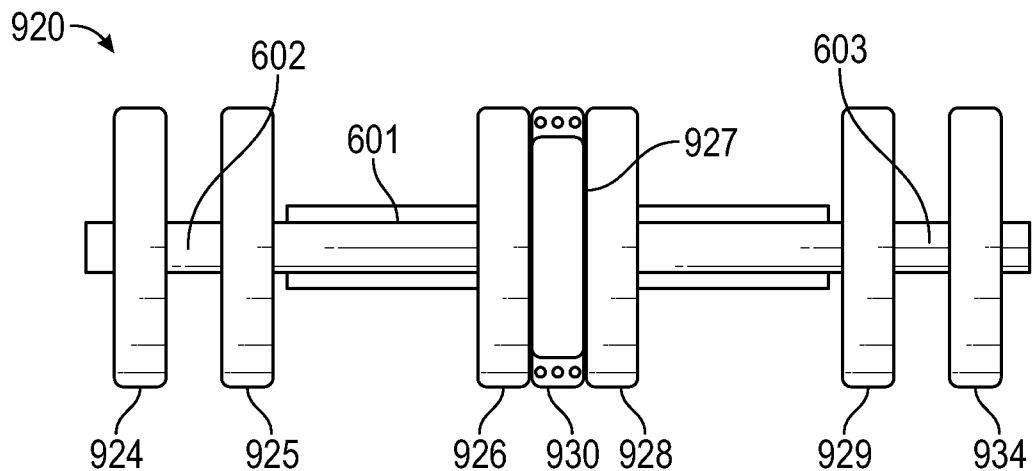

Referring now to FIG. 9C, another embodiment of a pig 920 according to embodiments herein is illustrated from a side end view, where like numerals represent like parts. The embodiment of FIG. 9C is similar to that of the embodiment of FIG. 6A. However, instead having three pneumatic wheels, the pig 920 may have seven pneumatic wheels. For example, a first pneumatic wheel 924 and a second pneumatic wheel 925 may be mounted on the first telescopic arm 602, a third pneumatic wheel 926, a fourth pneumatic wheel 927, and a fifth pneumatic wheel 928 may be mounted on the piston 601, and a sixth pneumatic wheel 929 and a seventh pneumatic wheel 934 may be mounted on the second telescopic arm 603. Additionally, an inductor 930 may be integrated in the fourth pneumatic wheel 927 to conduct welding from inside the pipeline.

Figure 10:
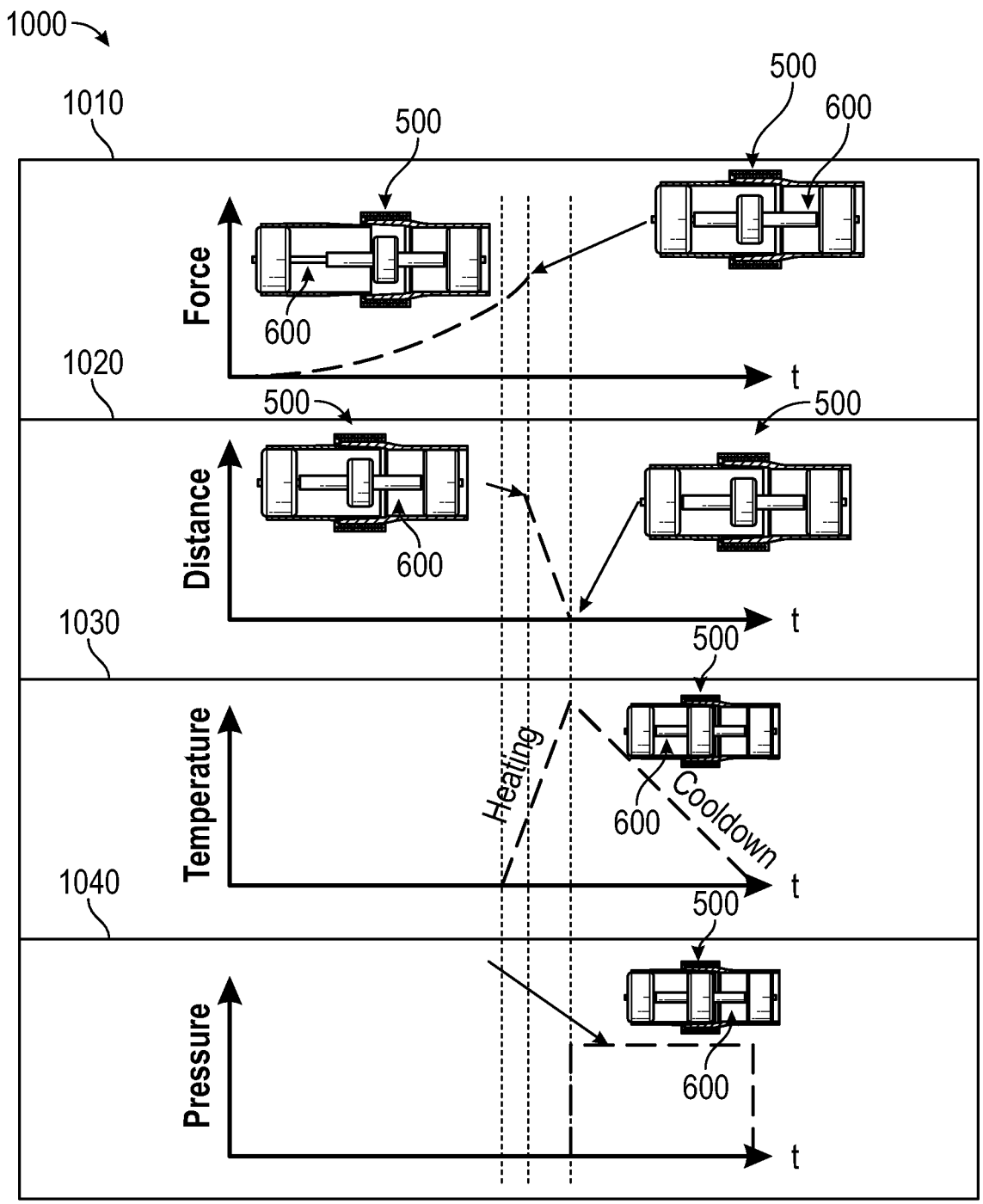
FIG. 10 is an exemplary chart in accordance with one or more embodiments of the present disclosure.

Now referring to FIG. 10, chart 1000 shows an exemplary sequence of operations performed between the inductor 500 and the pig 600, sometimes simultaneously and synchronized. For example, a process dictated by s command control may indicate an interaction between the inductor 500 and the pig 600. Additionally, all data may be centralized in a control center (such as the computer system described in FIG. 14). Further, data may be exchanged in the control center when the inductor 500 and the pig 600 have to synchronize and interact. In some embodiments, the inductor 500 and the pig 600 may have direct communication with each other.

In one or more embodiments, the chart 1000 may have a first portion 1010, a second portion 1020, a third portion 1030, and a fourth portion 1040. The first portion 1010 illustrates a reaction force to makeup versus time. A traction force or screwing force is applied and stopped when a prescribed value is reached. The second portion 1020 illustrates a distance to centered position versus time. In the second portion 1020, a central pneumatic wheel may be adjusted right and left of the telescopic arms. In some embodiments, an alignment may be controlled via a radio-frequency based triangulation system such as two reflectors on the pig 600 and one emitter placed on the inductor 500. The third portion 1030 illustrates a temperature of the thermoplastic layer versus time. In some embodiments, heating may be optionally started before the end of pipe positioning to facilitate contact between the thermoplastic layers. The fourth portion 1040 illustrates a pressure inside central pneumatic wheel versus time. In some embodiments, internal pressure may be applied during heating, at the end of heating or during cooldown. Additionally, an internal pressure may be used to improve induction welding performance.

Figure 11:
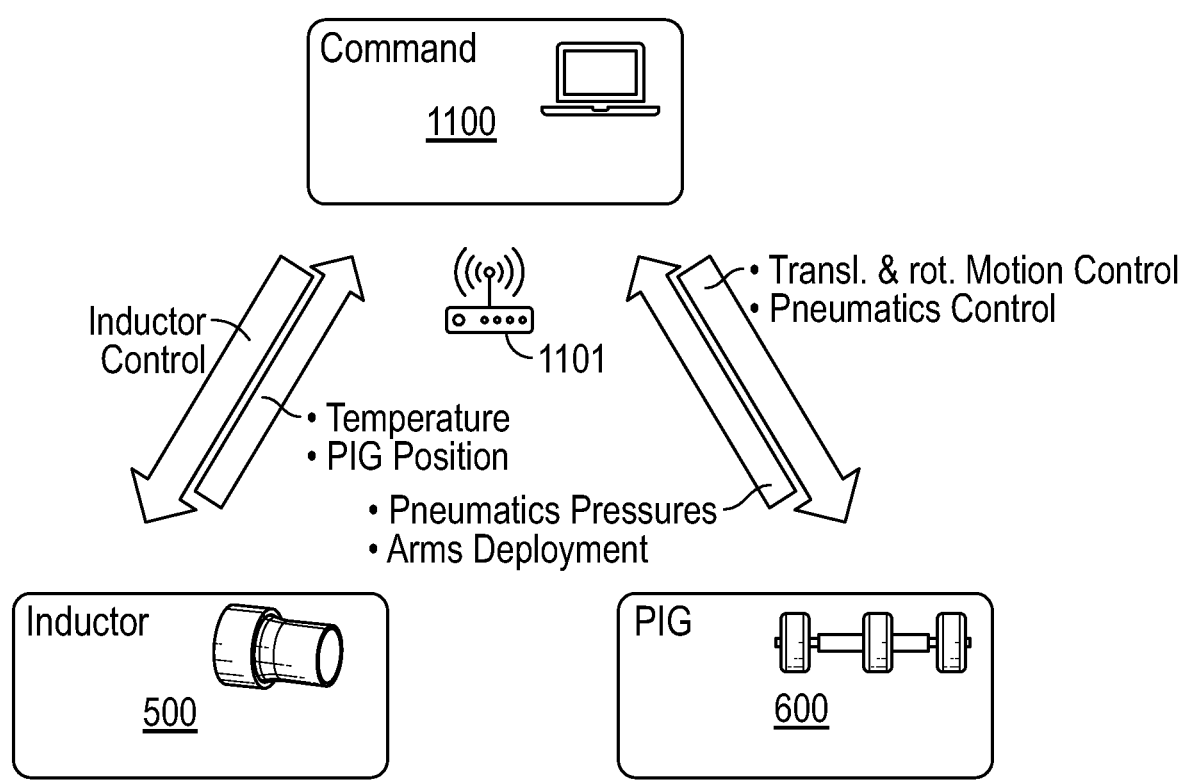
FIG. 11 is schematic cross-section representation of a data flow in accordance with one or more embodiments of the present disclosure.

Now referring to FIG. 11, a data flow between the inductor 500, the pig 600 and a command computer 1100 (such as the computer system described in FIG. 14) is illustrated. For example, the inductor 500 and the pig 600 communicate with the command computer 1100 through a wireless network 1101 to exchange information of current positioning and welding instructions. The command computer 1100 sends controls to the inductor 500 to conduct or stop induction welding operations. The inductor 500 transmitters back to the command computer 1100 data such as temperature during induction welding operations as well as a position of the pig 600 within the pipeline. Additionally, the command computer 1100 sends controls to the pig 600 to inflate or deflate the pneumatic wheels and fold or unfold the telescopic arms. The pig 600 transmitters back to the command computer 1100 data such as pneumatic pressure within the pneumatics wheel and a deployment position of the telescopic arms.

Figure 12:
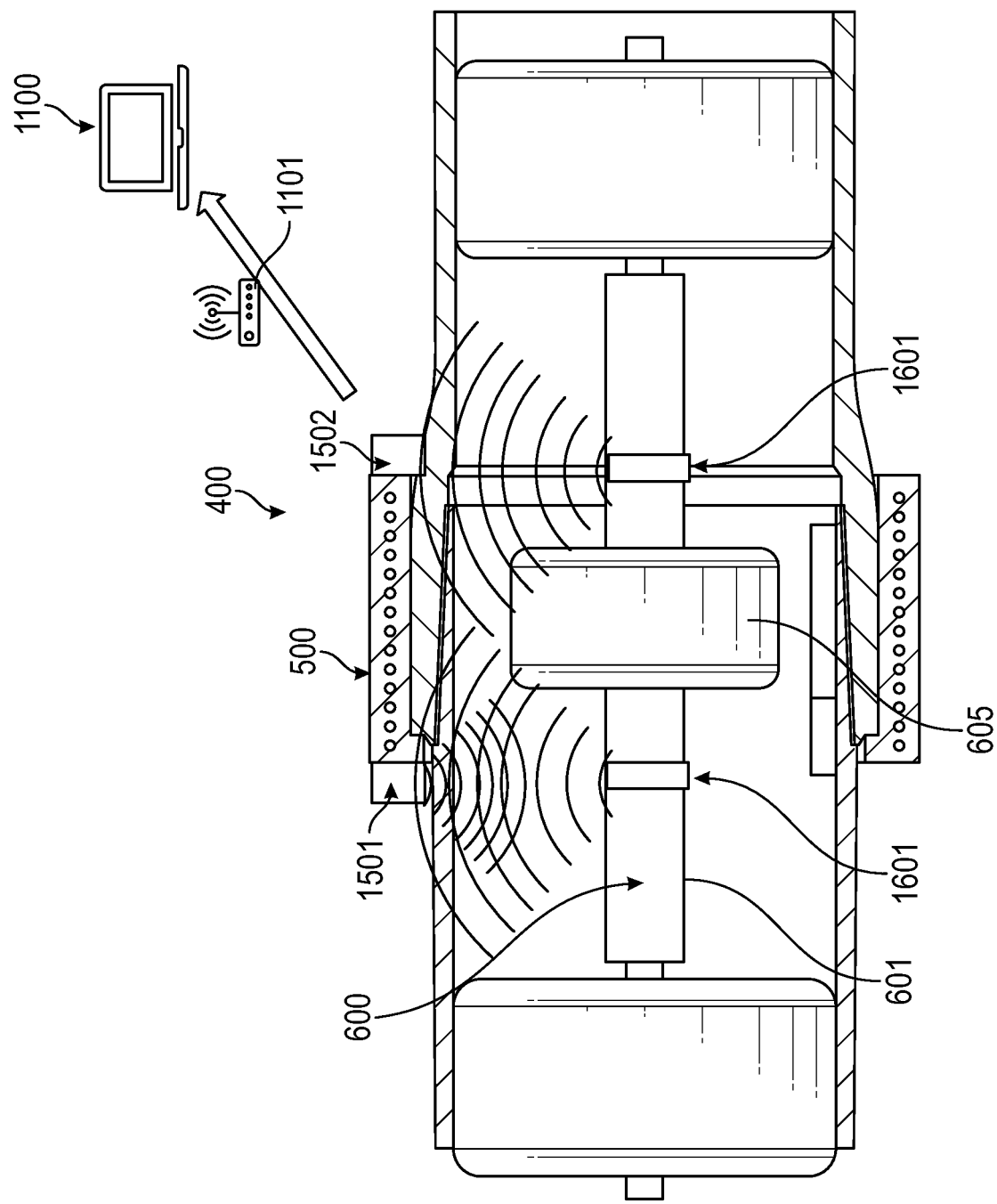
FIG. 12 is schematic cross-section representation of an automated installation of RTR joints system in accordance with one or more embodiments of the present disclosure.

Referring now to FIG. 12, the automated installation of RTR joints system 400 is illustrated with communication and command components. For example, the command computer 1100 communicates with the inductor 500 and the pig 600. Positioning the pig 600 accurately within the pipeline plays a vital part to accurately apply the right packing pressure over the thermoplastic sealing. Therefore, a method to accurately triangulate the position of the pig 600 is provided within the command computer 1100. For example, based on obtained coordinates, the command computer 1100 may request the displacement of the pig 600 to the left or the right to adjust the position of pneumatic wheels within the pipeline.

Still referring to FIG. 12, the inductor 500 is equipped with an emitter 1501 sending electro-magnetic waves towards the inside of the pipeline and a receiver 1502. The waves sent from the emitter 1501 may be acoustic waves or radio frequency waves. Additionally, the waves are reflected by reflecting straps 1601 located at two pre-defined positions on the pig 600. For example, the reflecting straps 1601 may be on the piston 601. As the reflecting straps 1601 are at two pre-defined positions on the piston 601, a distance from the reflecting straps 1601 to the second pneumatic wheel 605 is known. The receiver 1502 collects the combined response of each reflecting strap 1601. The signal is sent to the command computer 1100 wirelessly, over the wireless network 1101, from the receiver 1502. The command computer 1100 computes the axial relative position of the pig 600 with respect to the inductor 500 through interferometric analysis of the received signal. Additionally, as the distance from the reflecting straps 1601 to the second pneumatic wheel 605 is known, a position of the second pneumatic wheel 605 may be determined. It is further envisioned that a calibration step may be required prior to operating the pig 600 in a new pipeline.

Figure 13:
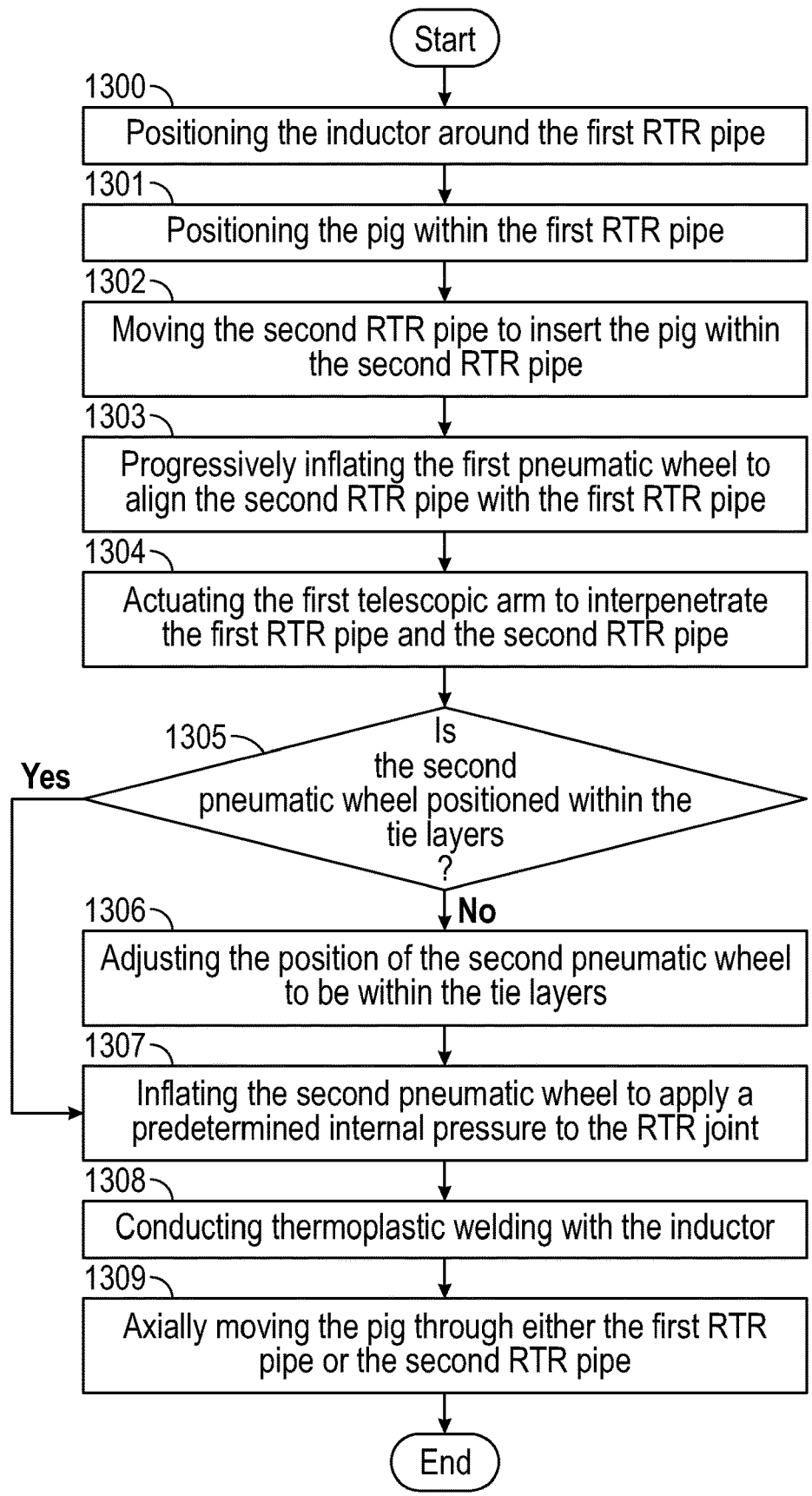
FIG. 13 is a flowchart in accordance with one or more embodiments of the present disclosure.

FIG. 13 is a flowchart showing a method of using automated installation of RTR joints system (400, 1200) on a pipeline. One or more blocks in FIG. 13 may be performed by one or more components (e.g., a computing system coupled to a controller in communication with the inductor and the pig). For example, a non-transitory computer readable medium may store instructions on a memory coupled to a processor such that the instructions include functionality for operating the inductor and the pig. While the various blocks in FIG. 13 are presented and described sequentially, one of ordinary skill in the art will appreciate that some or all of the blocks may be executed in different orders, may be combined or omitted; and some or all of the blocks may be executed in parallel. Furthermore, the blocks may be performed actively or passively.

In step 1300, the inductor is positioned around the first RTR pipe. For example, in the open position, the first ring of the inductor is placed around the socket end (i.e., box end) of the first RTR pipe. Next, the second ring is rotated about the hinge to close around the socket end and couple to the first ring thereby moving the inductor to the closed position. Additionally, the inductor may be slid in an axial direction to have the internal groove engage with the end surface of the socket end. Once the groove engages the end surface, the induction coils of the inductor are aimed towards the tie layers of the socket end. In some embodiments, straps may then be used to warp around the inductor to fix the inductor around the socket end.

In step 1301, the pig is positioned within the first RTR joint. For example, the pig may be inserted in the socket end of the first RTR pipe. The pneumatic wheels of the pig may initially all be deflated so that the pig may be inserted into the socket end. The third pneumatic wheel of the pig is first inserted into the socket end. The pig is moved further into the first RTR pipe such that the third pneumatic wheel moves past the tie layers of the socket end to position the second pneumatic wheel within the tie layer. Additionally, the first pneumatic wheel is positioned outside of the socket end. Further, the third pneumatic wheel is then inflated to have the flat circumferential profile of the third pneumatic wheel contact the inner surface of the first RTR pipe. For example, the compressors embedded in the pig provide pneumatic pressure to inflate the third pneumatic wheel. The third pneumatic wheel may be inflated to a size to create enough pressure to seal the third pneumatic wheel against the first RTR pipe. By sealing the third pneumatic wheel against the first RTR pipe, the pig is suspended from the first RTR pipe. It is further envisioned that the second telescopic arm is in a folded position to be fully retracted.

In step 1302, the second RTR joint is moved towards the first RTR pipe such that the pig is inserted into the second RTR joint. For example, a lifting device, such as a crane, lifts the second RTR joint and axially moves the second RTR joint towards the first RTR pipe. Additionally, the second RTR pipe may be angled to ease the insertion of the first pneumatic wheel into the spigot end (i.e., pin end) of the second RTR pipe. Further, the first telescopic arm is in unfolded position. The spigot end of the second RTR pipe is also partially inserted into the socket end of the first RTR pipe.

In step 1303, the first pneumatic wheel is progressively inflated to align the second RTR pipe with the first RTR pipe. For example, as the first pneumatic wheel progressively inflates, the second RTR pipe begins to straighten out such that the second RTR pipe becomes coaxial with the first RTR pipe. The compressors embedded in the pig provide pneumatic pressure to inflate the first pneumatic wheel. The first pneumatic wheel may be inflated to a size to create enough pressure to seal the first pneumatic wheel against the second RTR pipe.

In step 1304, the first telescopic arm is actuated to interpenetrate the first RTR pipe and the second RTR pipe. For example, the piston of the pig hydraulically retracts the first telescopic arm to fold within itself. As the first pneumatic wheel is sealed against the second RTR pipe, the first pneumatic wheel will axially move the second RTR pipe in the direction of the first telescopic arm retracting. By retracting the first telescopic arm, the spigot end of the second RTR pipe will be fully inserted into the socket end of the first RTR pipe.

In step 1305, with the second RTR pipe inserted into the first RTR pipe, a position of the second pneumatic wheel is determined. For example, the emitter on the inductor sends electro-magnetic waves towards the pig. The electro-magnetic waves reflect off the reflecting straps on the piston and return to the receiver on the inductor. The receiver then sends the data to the computer which computes the axial position of the second pneumatic wheel based on the relative position of the reflecting straps with respect to the inductor. If the second pneumatic wheel is positioned within tie layers of the spigot end and the socket end, this indicates that the second pneumatic wheel is in the correct position to apply pressure to the tie layers for induction welding and the method moves to step 1307. However, if the second pneumatic wheel is not positioned within tie layers of the spigot end and the socket end, this indicates that the second pneumatic wheel is not in the correct position and pressure will not be accurately applied to the tie layers for induction welding. With the second pneumatic wheel not correctly positioned in the tie layers, the method moves to step 1306.

In step 1306, the position of the second pneumatic wheel is adjusted to be within the tie layers. For example, either the first pneumatic wheel or the third pneumatic wheel may be deflated or stay inflated such that either telescopic arm may be actuated to move the pig within the first and second RTR pipes. Additionally, as the pig axially moves, the emitter will continuously send electro-magnetic waves to reflect off the reflecting straps to measure the position of the second pneumatic wheel. Once the second pneumatic wheel is positioned correctly within the tie layers, the method moves to step 1307.

In step 1307, the second pneumatic wheel is inflated to apply a predetermined internal pressure to the RTR joint (e.g., the socket and spigot end made up together). For example, compressors embedded in the piston provide pneumatic pressure to inflate the second pneumatic wheel. When inflated, the second pneumatic wheel will press against an inner surface of the spigot end of the second RTR pipe. The predetermined internal pressure is translated through the inner surface of the spigot end to be applied to the tie layers of the socket and spigot end.

In step 1308, the inductor is operated to conduct thermoplastic welding. For example, the induction coils of the inductor generate induction heating along the spigot-socket interface between the first RTR pipe and the second RTR pipe. This will eventually lead to melting, solidification, and complete fusion between the two tie layers. Those skilled in the art will readily appreciate that the induction welding process parameters (e.g., power, frequency, heating time, etc.) can be properly determined for different situations based on laboratory experiments and numerical simulation results. Depending on the thermoplastic resin used for the tie layers, a controlled cooling may be required. PEEK, for example, can become very brittle, if the heating/cooling is not controlled. High crystallinity will lead to a more brittle tie-layer. A toughened thermoplastic or elastomer will be more flexible and absorb such local deformation and loadings. Additionally, the predetermined internal pressure from the second pneumatic wheel is maintained a cooldown of the thermoplastic sealing of the tie layers of the first RTR pipe and the second RTR pipe. The applied internal pressure ensures that a correct pressure is maintained during the cooldown of the thermoplastic sealing. In some embodiments, the inductor and the pig synchronize the welding with the applied internal pressure.

In step 1309, after the thermoplastic welding is completed, the pig is axially moved through either the first RTR pipe or the second RTR pipe. For example, if the next RTR joint to be made is at the socket end of the second RTR pipe, the pig axially moves through the second RTR pipe away from the first RTR pipe. Alternatively, if the next RTR joint to be made is at the spigot end of the first RTR pipe, the pig axially moves through the first RTR pipe away from the second RTR pipe.

To axially move the pig, all the pneumatic wheels are inflated first. Next, the first pneumatic wheel is deflated via the compressors decreasing the pneumatic pressure within the first pneumatic wheel. Next, the first telescopic arm is actuated to unfolded and extend outwardly from the piston. Then, the first pneumatic wheel is inflated by increasing the pneumatic pressure via the compressors. Additionally, the second pneumatic wheel is deflated via the compressors decreasing the pneumatic pressure within the second pneumatic wheel. Now, the second telescopic arm is actuated to unfolded and extend outwardly from the piston while the first telescopic arm is retracted to be folded. The second pneumatic wheel is now inflated by increasing the pneumatic pressure via the compressors and the third pneumatic wheel is deflated via the compressors decreasing the pneumatic pressure within the third pneumatic wheel. Finally, the second telescopic arm is actuated to be folded, and each of the pneumatic wheels are fully inflated to complete a translation increment movement of the pig. The inflating/deflating of the pneumatic wheels and the folding/unfolding of the telescopic arms axially moves the pig. The axial movement of the pig may be repeated as needed to start new translation increment movement cycles and continue moving the pig along the corresponding RTR pipe. After the pig has moved to the next RTR joint, steps 1300-1309 may be repeated to continue making up RTR pipes to form a pipeline.

Figure 14:
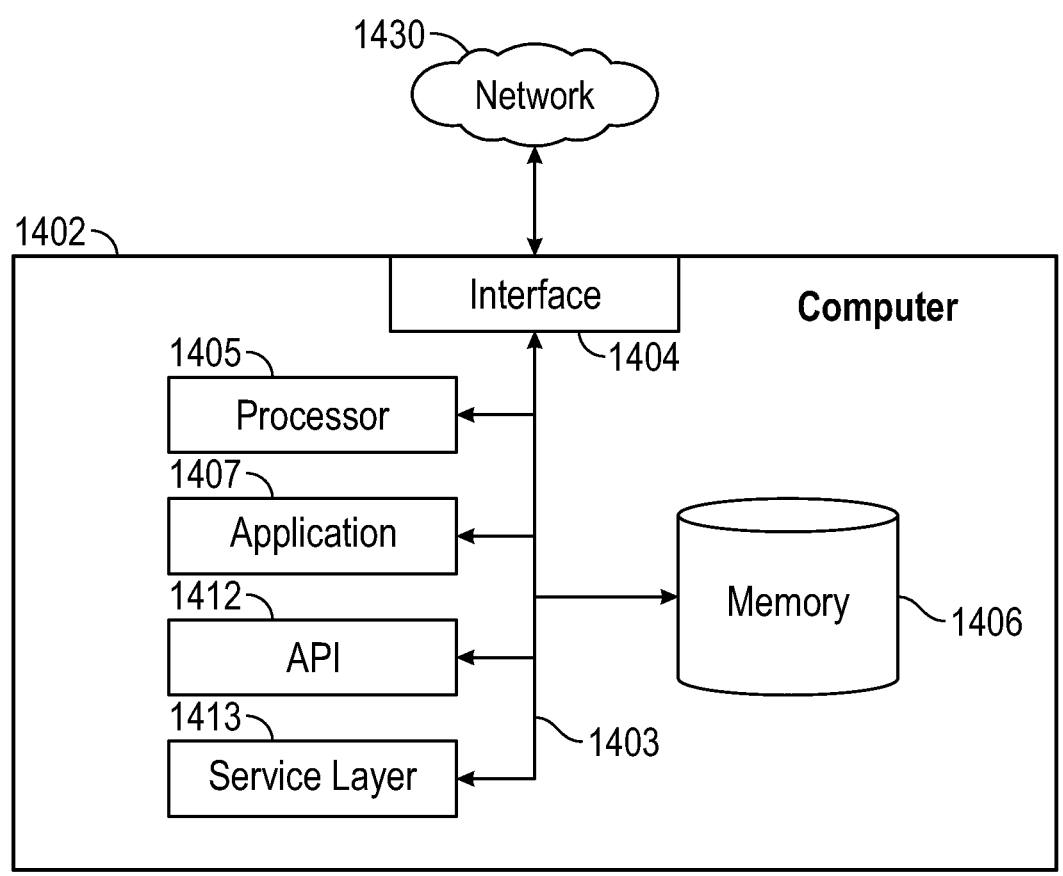
FIG. 14 illustrates a computer system in accordance with one or more embodiments of the present disclosure.

Embodiments disclosed herein for operating the automated installation of RTR joints system 400 and implementing the flowchart of FIG. 13 may be implemented on a computing system. FIG. 14 is a block diagram of a computer system 1402 used to provide computational functionalities associated with described algorithms, methods, functions, processes, flows, and procedures as described in the instant disclosure, according to an implementation. The illustrated computer 1402 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1402 may include a computer that includes an input device, such as a keypad, keyboard, touch screen, or other device that can accept user information, and an output device that conveys information associated with the operation of the computer 1402, including digital data, visual, or audio information (or a combination of information), or a GUI.

The computer 1402 can serve in a role as a client, network component, a server, a database or other persistency, or any other component (or a combination of roles) of a computer system for performing the subject matter described in the instant disclosure. The illustrated computer 1402 is communicably coupled with a network 1430. In some implementations, one or more components of the computer 1402 may be configured to operate within environments, including cloud-computing-based, local, global, or other environment (or a combination of environments).

At a high level, the computer 1402 is an electronic computing device operable to receive, transmit, process, store, or manage data and information associated with the described subject matter. According to some implementations, the computer 1402 may also include or be communicably coupled with an application server, e-mail server, web server, caching server, streaming data server, business intelligence (BI) server, or other server (or a combination of servers).

The computer 1402 can receive requests over network 1430 from a client application (for example, executing on another computer 1402) and responding to the received requests by processing the said requests in an appropriate software application. In addition, requests may also be sent to the computer 1402 from internal users (for example, from a command console or by other appropriate access method), external or third-parties, other automated applications, as well as any other appropriate entities, individuals, systems, or computers.

Each of the components of the computer 1402 can communicate using a system bus 1403. In some implementations, any or all of the components of the computer 1402, both hardware or software (or a combination of hardware and software), may interface with each other or the interface 1404 (or a combination of both) over the system bus 1403 using an application programming interface (API) 1412 or a service layer 1413 (or a combination of the API 1412 and service layer 1413. The API 1412 may include specifications for routines, data structures, and object classes. The API 1412 may be either computer-language independent or dependent and refer to a complete interface, a single function, or even a set of APIs. The service layer 1413 provides software services to the computer 1402 or other components (whether or not illustrated) that are communicably coupled to the computer 1402. The functionality of the computer 1402 may be accessible for all service consumers using this service layer. Software services, such as those provided by the service layer 1413, provide reusable, defined business functionalities through a defined interface. For example, the interface may be software written in JAVA, C++, or other suitable language providing data in extensible markup language (XML) format or other suitable format. While illustrated as an integrated component of the computer 1402, alternative implementations may illustrate the API 1412 or the service layer 1413 as stand-alone components in relation to other components of the computer 1402 or other components (whether or not illustrated) that are communicably coupled to the computer 1402. Moreover, any or all parts of the API 1412 or the service layer 1413 may be implemented as child or sub-modules of another software module, enterprise application, or hardware module without departing from the scope of this disclosure.

The computer 1402 includes an interface 1404. Although illustrated as a single interface 1404 in FIG. 14, two or more interfaces 1404 may be used according to particular needs, desires, or particular implementations of the computer 1402. The interface 1404 is used by the computer 1402 for communicating with other systems in a distributed environment that are connected to the network 1430. Generally, the interface 1404 includes logic encoded in software or hardware (or a combination of software and hardware) and operable to communicate with the network 1430. More specifically, the interface 1404 may include software supporting one or more communication protocols associated with communications such that the network 1430 or interface's hardware is operable to communicate physical signals within and outside of the illustrated computer 1402.

The computer 1402 includes at least one computer processor 1405. Although illustrated as a single computer processor 1405 in FIG. 14, two or more processors may be used according to particular needs, desires, or particular implementations of the computer 1402. Generally, the computer processor 1405 executes instructions and manipulates data to perform the operations of the computer 1402 and any algorithms, methods, functions, processes, flows, and procedures as described in the instant disclosure.

The computer 1402 also includes a memory 1406 that holds data for the computer 1402 or other components (or a combination of both) that can be connected to the network 1430. For example, the memory 1406 can be a database storing data consistent with this disclosure. Although illustrated as a single memory 1406 in FIG. 14, two or more memories may be used according to particular needs, desires, or particular implementations of the computer 1402 and the described functionality. While the memory 1406 is illustrated as an integral component of the computer 1402, in alternative implementations, memory 1406 can be external to the computer 1402.

The application 1407 is an algorithmic software engine providing functionality according to particular needs, desires, or particular implementations of the computer 1402, particularly with respect to functionality described in this disclosure. For example, the application 1407 can serve as one or more components, modules, applications, etc. Further, although illustrated as a single application 1407, the application 1407 may be implemented as multiple applications 1407 on the computer 1402. In addition, although illustrated as integral to the computer 1402, in alternative implementations, the application 1407 can be external to the computer 1402.

There may be any number of computers 1402 associated with, or external to, a computer system containing computer 1402, each computer 1402 communicating over the network 1430. Further, the term "client," "user," and other appropriate terminology may be used interchangeably as appropriate without departing from the scope of this disclosure. Moreover, this disclosure contemplates that many users may use one computer 1402, or that one user may use multiple computers 1402.

In some embodiments, the computer 1402 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (Saas), mobile "backend" as a service (MBaaS), serverless computing, artificial intelligence (AI) as a service (AIaaS), and/or function as a service (FaaS).

In addition to the benefits described above, the systems and methods of the present disclosure may be used to automated and increase accurate positioning, alignment, and makeup of the to-be-jointed pipes while minimizing human error. Overall, the automated installation of RTR joints system may minimize product engineering, risk associated with installation of RTR joints, reduction of assembly time, hardware cost reduction, and weight and envelope reduction.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A system for coupling pipes comprising:
a first pipe having a socket end;
a second pipe having a spigot end, wherein the spigot end is inserted into the socket end to form a socket/spigot interface,
wherein the first pipe and the second pipe are made from a reinforced thermosetting resin (RTR) and a thermoplastic material is disposed between an interior of the first pipe and an exterior of the second pipe;
an inductor disposed around the socket end, wherein, upon application of induction heating from induction coils of the inductor, heat thereby generated between the first pipe and the second pipe is sufficient to melt the thermoplastic material such that, when the heat is removed, the thermoplastic material hardens and seals the first pipe to the second pipe; and
a pig having a frame disposed in the first pipe and the second pipe, the pig comprising:
a piston with a first telescopic arm extending axially outward from one end of the piston and a second telescopic arm extending axially outward from an opposite end of the piston;
a first pneumatic wheel on the first telescopic arm, wherein the first pneumatic wheel is positioned in the first pipe;
a second pneumatic wheel mounted on the piston, wherein the second pneumatic wheel is positioned in the spigot end; and
a third pneumatic wheel mounted on the second telescopic arm, wherein the third pneumatic wheel is positioned in the second pipe.

2. The system of claim 1, wherein the second pneumatic wheel is inflated to apply an internal pressure to the spigot end during the induction heating and the heat being removed.

3. The system of claim 1, wherein the first pneumatic wheel and the third pneumatic wheel are configured to be inflated and deflated against the first pipe and the second pipe.

4. The system of claim 1, wherein the inductor comprises an emitter and a receiver.

5. The system of claim 4, wherein reflecting straps on the piston reflect waves from the emitter back to the receiver.

6. The system of claim 5, wherein the receiver is in communication with a computer to compute an axial position of the pig.

7. The system of claim 1, wherein the first telescopic arm and the second telescopic arm each have a folded position and an unfolded position.

* * * * *